(12) United States Patent
Pliasunov et al.

(10) Patent No.: US 11,436,596 B2
(45) Date of Patent: Sep. 6, 2022

(54) ELIGIBILITY DETERMINATION FOR DELEGATION EXEMPTION TO STRONG AUTHENTICATION REQUIREMENTS

(71) Applicant: Amazon Technologies, Inc., Seattle, WA (US)

(72) Inventors: Artem Pliasunov, Vancouver (CA); Jagan Cheboluraghava, Vancouver (CA); Helmuth Elsner, Vancouver (CA); Daewoong Ha, Bellevue, WA (US); Steven H. Reis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 345 days.

(21) Appl. No.: 16/553,985

(22) Filed: Aug. 28, 2019

(65) Prior Publication Data

US 2021/0065171 A1    Mar. 4, 2021

(51) Int. Cl.
*G06Q 20/38* (2012.01)
*G06N 20/00* (2019.01)

(52) U.S. Cl.
CPC ......... *G06Q 20/3821* (2013.01); *G06N 20/00* (2019.01); *G06Q 20/3829* (2013.01)

(58) Field of Classification Search
None
See application file for complete search history.

(56) References Cited

U.S. PATENT DOCUMENTS

| | | | |
|---|---|---|---|
| 9,767,474 B1 | 9/2017 | Ramalingam et al. | |
| 9,842,330 B1 | 12/2017 | Van Os et al. | |
| 9,898,740 B2 * | 2/2018 | Weller | H04L 9/3273 |
| 10,672,005 B1 | 6/2020 | Hart et al. | |
| 10,755,281 B1 * | 8/2020 | Yip | G06Q 20/4016 |
| 2012/0171990 A1 | 7/2012 | Williams et al. | |
| 2013/0073463 A1 | 3/2013 | Dimmick et al. | |
| 2013/0346302 A1 | 12/2013 | Purves et al. | |
| 2015/0149308 A1 | 5/2015 | Lin | |
| 2015/0269578 A1 * | 9/2015 | Subramanian | G06Q 20/12 705/44 |
| 2016/0260090 A1 | 9/2016 | Healy et al. | |

(Continued)

OTHER PUBLICATIONS

U.S. Appl. No. 16/554,020, filed Aug. 28, 2019.

(Continued)

*Primary Examiner* — Jamie R Kucab

(74) *Attorney, Agent, or Firm* — Thomas | Horstemeyer, LLP

(57) ABSTRACT

Disclosed are various embodiments for determining eligibility for the delegation exemption to strong customer authentication requirements. In one embodiment, a payee entity determines that a payment transaction using a payment instrument issued by a payment issuer is eligible for a delegation exemption from an authentication challenge by the payment issuer based at least in part on a previous authentication challenge by the payment issuer being successfully completed for a previous payment transaction using the payment instrument and a returned payment history associated with the payment instrument. Subsequently, the payee entity generates an alternative authentication challenge that does not involve the payment issuer instead of the authentication challenge by the payment issuer.

20 Claims, 14 Drawing Sheets

(56) References Cited

U.S. PATENT DOCUMENTS

| | | | |
|---|---|---|---|
| 2017/0068421 A1 | 3/2017 | Carlson et al. | |
| 2017/0109752 A1* | 4/2017 | Hubbard | H04L 63/10 |
| 2017/0213200 A1 | 7/2017 | Purves | |
| 2018/0137504 A1* | 5/2018 | Goldenberg | G06Q 20/4016 |
| 2018/0174149 A1* | 6/2018 | Goldschmidt | G06Q 20/202 |
| 2018/0300729 A1 | 10/2018 | Siddens et al. | |
| 2019/0108505 A1 | 4/2019 | Perlman | |
| 2019/0188705 A1 | 6/2019 | Ecker et al. | |
| 2020/0372495 A1* | 11/2020 | Maheshwari | G06Q 20/409 |

OTHER PUBLICATIONS

U.S. Appl. No. 16/554,020, filed Aug. 28, 2019, Non-Final Office Action dated Jan. 27, 2021.

U.S. Appl. No. 16/554,020, filed Aug. 28, 2019, Final Office Action dated Aug. 31, 2021.

U.S. Appl. No. 16/543,283, filed Aug. 16, 2019.

U.S. Appl. No. 16/543,283, filed Aug. 16, 2019, Office Action stating Restriction Requirement dated Aug. 19, 2020.

U.S. Appl. No. 16/543,283, filed Aug. 16, 2019, Non-Final Office Action dated Dec. 30, 2020.

U.S. Appl. No. 16/543,283, filed Aug. 16, 2019, Final Office Action dated Jun. 24, 2021.

U.S. Appl. No. 16/553,931, filed Aug. 28, 2019.

U.S. Appl. No. 16/553,931, filed Aug. 28, 2019, Non-Final Office Action dated Sep. 16, 2021.

U.S. Appl. No. 16/585,611, filed Sep. 27, 2019.

U.S. Appl. No. 16/553,931, filed Aug. 28, 2019, Non-Final Office Action dated Sep. 13, 2021.

U.S. Appl. No. 16/543,283, filed Aug. 16, 2019, Restriction/Election dated Aug. 19, 2020.

PCT Patent Application PCT/US2020/047554 filed on Aug. 23, 2020, International Search Report and Written Opinion dated Nov. 25, 2020.

PCT Patent Application PCT/US2020/046106 filed on Aug. 13, 2020, International Search Report and Written Opinion dated Oct. 6, 2020.

PCT Patent Application PCT/US2020/046955 filed on Aug. 19, 2020, International Search Report and Written Opinion dated Oct. 28, 2020.

PCT Patent Application PCT/US2020/047294 filed on Aug. 21, 2020, International Search Report and Written Opinion dated Oct. 29, 2020.

Mastercard: "Strong Customer Authentication and PSD2 How to adapt to new regulation in Europe", Aug. 17, 2018 (Aug. 17, 2018), XP055741464, Retrieved from the Internet: URL:https://newsroom.mastercard.com/eu/files/2018/08/Security-Matters-Authentication-under-PSD2-and-SCA-Mastercard-White-Paper 2.pdf [retrieved on Oct. 19, 2020] the whole document.

Vice Chairman: "PSD2 draft Regulatory Technical Specifications", ETSI Draft; ESI(17)60 037, European Telecommunications Standards Institute (ETSI), 650, Route Des Lucioles; F-06921 Sophia-Antipolis; France Oct. 6, 2017 (Oct. 6, 2017), pp. 1-31, XP014300863, Retrieved from the Internet: URL: docbox.etsi.org\ESI\ESI\05-CONTRIBUTIO NS\2017\ESI(17)60 037 PSD2 draft Regulator y Technical Specifications pdf—[retrieved on Oct. 6, 2017] the whole document.

U.S. Appl. No. 16/554,020, entitled "User Interfaces That Differentiate Payment Instruments Having a Trusted Beneficiary" filed Aug. 28, 2019.

U.S. Appl. No. 16/543,283, entitled "Predicting Successful Exemptions to Strong Authentication Requirements" filed Aug. 16, 2019.

U.S. Appl. No. 16/553,931, entitled "Selecting Exemptions to Strong Authentication Requirements" filed Aug. 28, 2019.

U.S. Appl. No. 16/585,611, entitled "Delegated Payment Verification for Shared Payment Instruments" filed Sep. 27, 2019.

* cited by examiner

ELIGIBILITY DETERMINATION FOR DELEGATION EXEMPTION TO STRONG AUTHENTICATION REQUIREMENTS

BACKGROUND

With the advent of chip-based credit cards, most fraud associated with credit card transactions is associated with transactions where the physical card is not present for verification by the merchant and card issuer. For example, transactions over the telephone or via the Internet are card-not-present (CNP) transactions. In CNP transactions, it is important to authenticate users with a high degree of confidence. Three-domain secure (3DS) is a protocol that enables users to authenticate themselves with the card issuer when making CNP transactions. 3DS with multi-factor authentication is one form of a strong customer authentication (SCA). SCA is a requirement of the Payment Service Directive 2 (PSD2) in the European Union, although PSD2 provides for exemptions from SCA under certain circumstances.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
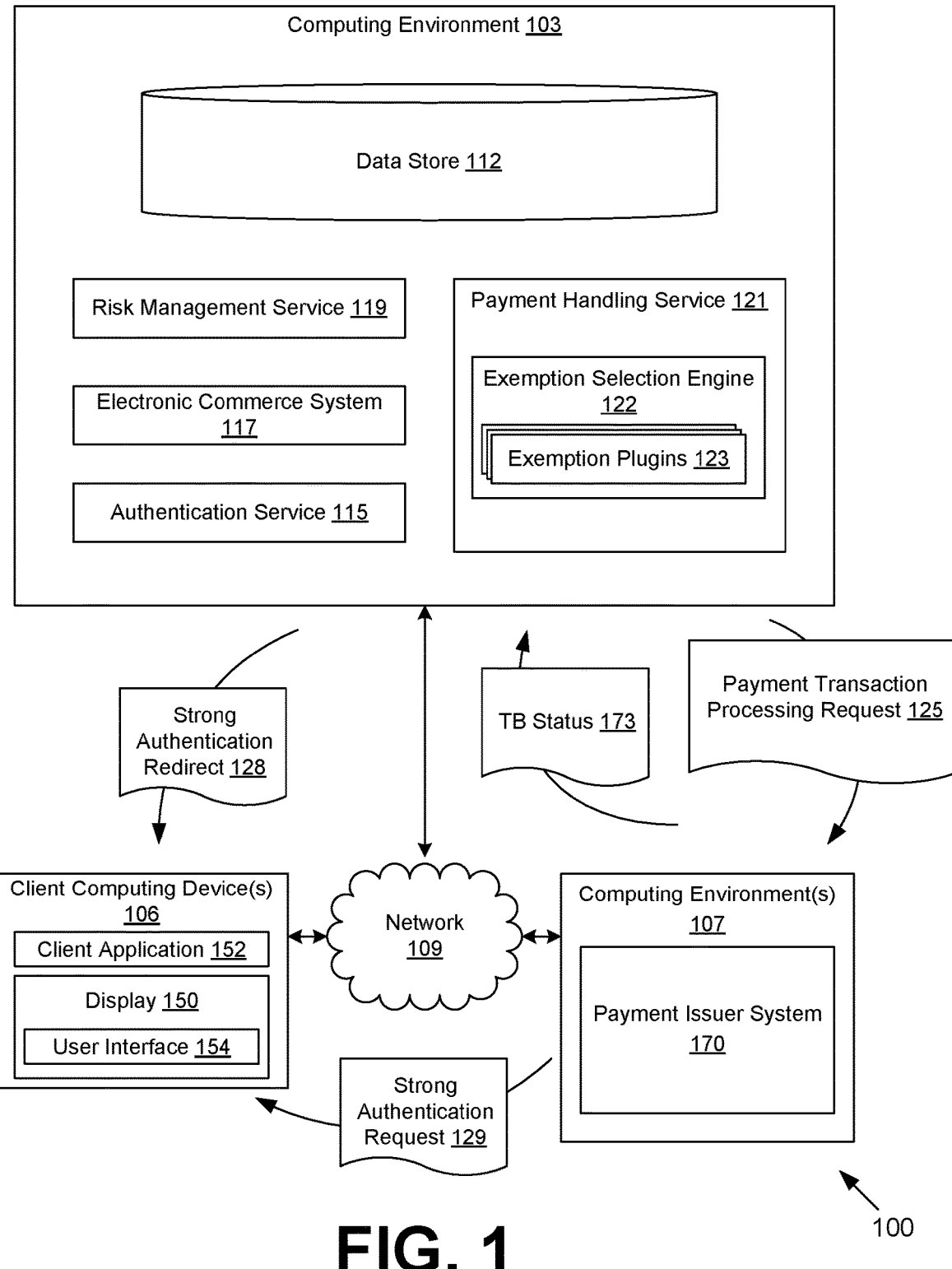
FIG. 1 is a schematic block diagram of a networked environment according to various embodiments of the present disclosure.

The present disclosure relates to user interfaces that differentiate payment instruments that have whitelisted a current merchant or payee as a trusted beneficiary, determining eligibility for a delegation exemption to authentication by a payment issuer, and selecting an exemption to authentication by a payment issuer. Each of these techniques can be performed individually or in combination by a system. The Payment Service Directive 2 (PSD2) in the European Union generally requires the use of strong customer authentication (SCA) in card-not-present (CNP) transactions in order to reduce fraud. One form of SCA involves using the three-domain secure (3DS) protocol to redirect users to a system operated by the payment network or card issuer for a second level of authentication on top of whatever authentication was performed by the merchant. For instance, the card issuer may require the user to provide a one-time password that was sent to the user's telephone number or email address that is on file with the card issuer. Alternatively, or additionally, the card issuer may require the user to supply a password that was previously configured by the user with the card issuer in association with a specific payment card.

When SCA is employed, the user has already undergone a merchant-specific authentication process, which may involve providing a password, answering knowledge-based questions, providing a one-time password, and/or meeting other authentication challenges. The risk management systems of the merchant may require various authentication challenges based upon a risk level determined for the transaction. For example, a user may have to reenter a stored credit card number when having items shipped to a new shipping address. After these challenges are completed, SCA comes into play.

Although SCA may assist in reducing payment instrument fraud, it also increases user friction in the checkout or payment process. The user may have already responded successfully to one or more authentication challenges by the merchant, and further challenges slow down or delay the payment process. Further, with 3DS, users may be presented with a user interface that is controlled by the card issuer or payment network instead of the merchant, resulting in an inconsistent, unfamiliar, and perhaps confusing user interface in the midst of the payment process. Also, by redirecting client devices to a different network, users may experience additional network latencies and failures. Thus, from the merchant's perspective, it may be generally desirable to avoid SCA where possible.

PSD2 provides for several types of exemptions from SCA. One such exemption comes into play when a user whitelists a merchant or other payee to be a trusted beneficiary with the payment issuer. As an example, a user may undergo SCA, and during SCA, the user may be presented with an option to whitelist the payee as a trusted beneficiary. As another example, the user may add the payee to a whitelist of trusted beneficiaries through the payment issuer's network site or mobile application. As yet another example, the user may contact a customer service representative of the payment issuer and request that the payee be added to a whitelist of trusted beneficiaries. In some instances, the user may still undergo SCA despite naming the payee as a trusted beneficiary, but in general, the user will experience fewer authentication challenges and less friction in the payment process. In some scenarios, certain payment instruments may not support designating trusted beneficiaries.

Various embodiments of the present disclosure introduce user interfaces that differentiate payment instruments for which the payee or merchant has been designated as a trusted beneficiary. For example, a user may have three valid payment cards added to a user account, and one of the three designates the merchant as a trusted beneficiary. The particular payment card naming the merchant as a trusted beneficiary may be promoted in a card selection user interface with a badge icon, text, or other indicia that informs the user that the payment card will provide a faster payment experience. Moreover, the user interface that performs SCA may be customized to recommend or promote the trusted beneficiary option if it is available.

Another such exemption to SCA is the delegation exemption. With the delegation exemption, the payee entity and the payment issuer have agreed to allow the payee entity to perform an SCA itself in lieu of the payment issuer performing the SCA. Unlike the transaction risk assessment (TRA) exemption, the payee entity does agree to perform an additional authentication challenge (e.g., using a one-time password sent via a communication channel, a biometric challenge, etc.) under the delegation exemption. With the delegation exemption, the liability for fraudulent payment transactions shifts from the payment issuer to the payee entity, making it important to correctly qualify such payment transactions. As will be described, the payee entity may examine payment reversal histories and payment instrument usage histories to determine whether to utilize the delegation exemption. The payee entity may establish criteria such as value thresholds to further qualify payment transactions. In some scenarios, the exemption request may be rejected by the payment issuer, and the user will still need to be redirected to SCA performed by the payment issuer.

With the availability of multiple types of exemptions to SCA, it may be beneficial to choose one exemption over another. For instance, the TRA exemption may not require an additional authentication challenge, while the delegation exemption would require the payee entity to perform an additional authentication challenge. Likewise, the low value transaction exemption may avoid additional authentication challenges, but may result in SCA by the payment issuer every N transactions. Recurring transaction exemptions, payee entity-initiated transaction exemptions, and exemptions related to inapplicability of regulations may be straightforward and favored, but applicable to only a subset of transactions. As will be described, an exemption selection engine offers the ability to identify an exemption for a payment transaction that applies to the payment transaction and has a greatest likelihood or probability of success in order to reduce user friction. Further, the exemption selection engine may be configured in some cases to prefer exemptions that do not shift liability from the payment issuer to the payee entity.

As one skilled in the art will appreciate in light of this disclosure, certain embodiments may be capable of achieving certain advantages, including some or all of the following: (1) improving the performance of a computing system by reducing network latency associated with communicating with a third-party system to enable SCA; (2) improving reliability of the computing system by avoiding communication over a third-party network with additional network hops to perform SCA; (3) improving security of a computer network by limiting the transmission of personal information to perform SCA; (4) improving the functioning of the computing system through a more streamlined payment process for low-risk transactions that reduces user frustration; (5) enhancing the user experience by avoiding third-party SCA user interfaces with an inconsistent look-and-feel; (6) avoiding a redirection to a third-party system for authentication, which conserves computing resources (e.g. processing utilization, memory utilization, network traffic, data payloads, etc.) on multiple systems, and improves the user's security by reducing an attack vector by not redirecting to another site (despite best efforts, the payment issuer system, the client computing device, and/or other intermediate devices may have malicious software unintentionally installed); (7) reducing the latency involved in determining which SCA exemption is applicable through the use of exemption-specific plugins that can be concurrently executed and can be co-located on one machine; (8) reducing latency when a user proceeds to "checkout" in a shopping session by pre-calculating exemption plugin responses when a user adds items to a shopping cart or when a user visits an item detail page; (9) through delegated authentication, tailoring the strong customer authentication to authentication factors that are device-specific to take advantage of biometric hardware or other particular features of hardware that may not be utilized by issuer SCA; and so forth. In the following discussion, a general description of the system and its components is provided, followed by a discussion of the operation of the same.

With reference to FIG. 1, shown is a networked environment 100 according to various embodiments. The networked environment 100 includes a computing environment 103, one or more client computing devices 106, and one or more computing environments 107, which may be in data communication via a network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 103 may be operated by or on behalf of a merchant or other entity operating an electronic commerce network site, a network site accepting donations on behalf of others, a network site accepting bill payments, and/or other network sites that involve payments by users. The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include an authentication service 115, an electronic commerce system 117, a risk management service 119, a payment handling service 121, and other applications, services, processes, systems, engines, or functionality not discussed in detail herein. The payment handling service 121 may include an exemption selection engine 122. The authentication service 115, a risk management service 119, the payment handling service 121, and the exemption selection engine 122 may be offered as a service to third parties. These services can be offered together as a group, where, for example, customers of a third-party merchant's web site are given the operation to pay with an account offered by a first party that also offers the services. In various implementations, the payment handling service 121 and the electronic commerce system 117 may be physically or logically isolated, may be coupled to separate and distinct computer networks, and/or may communicate over one or more computer networks.

The authentication service 115 is executed to authenticate users for access to resources on the computing environment 103, such as user account resources. The users are also authenticated for an ability to place orders or otherwise initiate payment transactions via the computing environment 103. In authenticating users, the authentication service 115 confirms to a degree of confidence that an individual user is who he or she claims to be. In this regard, the user may be asked to respond to one or more different authentication challenges, which may involve providing a password, answering one or more knowledge-based questions, providing a one-time password sent through a verified channel of communication such as an email address or telephone number, performing biometric recognition, and so forth. Authentication factors employed may include knowledge-based factors, possession-based factors, and biometric factors. In particular, when the delegation exemption is employed, the authentication service 115 may be required to perform an additional authentication challenge for the user in lieu of the payment issuer performing an additional authentication challenge.

The electronic commerce system 117 is executed to facilitate electronic commerce transactions via a network site. To this end, the electronic commerce system 117 may generate network pages or other forms of network content that enable users to browse or search for items of interest. The electronic commerce system 117 may allow users to place orders for items and then initiate payment for the orders. In various embodiments, the electronic commerce system 117 may include a shopping cart system whereby users add items of interest to an electronic shopping cart, and an order pipeline whereby users can consummate orders and select methods of payment.

The risk management service 119 is executed to perform a risk analysis with respect to users' interactions with the electronic commerce system 117 and any payment transactions. In this regard, the risk management service 119 may generate a risk score based on various criteria. Non-limiting examples of factors that may be considered in generating a risk score may include authentication failures and number of authentication attempts, geographic location of the client computing device 106, shipping address for an order, click trails or other behavior data, types of items ordered compared to historical orders, and so on. Comparison of such risk score to a risk threshold indicating the risk is relatively high may require a user to be authenticated via a stronger form of authentication. By contrast, if the risk score is relatively low, additional authentication factors may be avoided. The risk management service 119 may provide information such as returned payment or chargeback information for payment instruments as well as usage history for payment instruments for use in making a determination as to whether a payment transaction is eligible for an exemption.

The payment handling service 121 is executed to handle payment processing from the side of the merchant or other payee entity associated with the computing environment 103. The payment handling service 121 may handle payments for a variety of payment instruments, such as credit cards, debit cards, stored value cards, bank accounts, virtual wallets, and/or other payment instruments. The payment handling service 121 may handle payment preauthorizations, authorizations, and/or settlements. To this end, the payment handling service 121 may communicate with systems of the computing environment 107 to ensure that payment transactions are authorized.

The payment handling service 121 may include an exemption selection engine 122 which is configured to identify an exemption, if any, to be applied and/or requested for a payment transaction. Specifically, there may be a plurality of different exemptions that are supported by the payment handling service 121, and out of these different exemptions, some may be available or potentially available for a given payment transaction, while others may be unavailable. Moreover, if multiple exemptions are available, the exemption selection engine 122 may identify a particular exemption that is recommended or has the greatest likelihood of success, where success is defined as avoiding an authentication challenge performed by the payment issuer. Further, the exemption selection engine 122 may identify the particular exemption based at least in part on the particular exemption having a lowest predicted level of user friction. For example, the delegation exemption may require an additional authentication challenge performed by the payee entity, while the recurring transaction exemption may not have that requirement. Also, the exemption selection engine 122 may be configured to prefer exemptions that do not transfer liability for fraudulent transactions from the payment issuer to the payee entity.

It is noted that the exemption selection engine 122 may be offered as a service to third-party payee entities. For example, the exemption selection engine 122 may be stand-alone (i.e., not integrated with a payment handling service) and available to third-party payee entity services via an application programming interface (API) over the network 109. Through an API call, the third-party service may provide information about the payment transaction, and the exemption selection engine 122 may return a particular exemption or that no exemptions are available. In addition, the payment handling service 121 may offer payment transaction handling for third-party payee entities, in which case the payment handling service 121 may use the exemption selection engine 122 to identify an exemption for use in handling a particular payment transaction on behalf of a third-party payee entity.

In various embodiments, the exemption selection engine 122 employs a plugin architecture with a plurality of exemption plugins 123. Each of the exemption plugins 123 corresponds to a respective type of exemption. When queried for a specific payment transaction, an exemption plugin 123 determines whether its exemption is available (or at least predicted to be available) for the specific payment transaction. The exemption plugin 123 can return an indication of whether the exemption is available. Also, the exemption plugin 123 can also return data that may be used in requesting the exemption.

The exemption selection engine 122 and the exemption plugins 123 may be designed with strict latency requirements as they are executed synchronously with a payment workflow. The exemption selection engine 122 and the exemption plugins 123 should be very low latency so as not to delay the payment workflow. The exemption plugins 123 may be configured to be executed concurrently in separate threads or processes. Each of the exemption plugins 123 can be configured to operate in isolation from each other, where the operation of one exemption plugin 123 does not impact the operation of another exemption plugin 123. Any errors encountered by the exemption selection engine 122 and the exemption plugins 123 should not block the payment workflow. If an error or delay occurs beyond a threshold, the payment workflow may continue without an exemption.

The payment handling service 121 may send a payment transaction processing request 125 to a payment gateway or processor in the computing environment 107. The payment transaction processing request 125 may include a variety of information about the payment transaction, including user name, payment instrument identifying information, shipping address information, items ordered, values, and so forth. In some cases, the payment transaction processing request 125 will include an exemption request to exempt the particular payment transaction from an authentication requirement, such as strong customer authentication.

In one implementation, the payment transaction processing request 125 is an up to 65535 byte field having four subfields. The first subfield may specify a length in two bytes, indicating the number of bytes in the field. The second subfield may be a single byte and contain a hexadecimal value that identifies the tag/length/value (TLV) data that follows. The third subfield may be a two-byte subfield that specifies the total length of the TLV fields in this payment transaction processing request 125. The length may be variable depending on the data that follows. In positions 4-65535, the TLV data is presented. Each subfield has a defined tag, length, and value. The tag is used in conjunction with the dataset identifier value. The dataset subfields may be present in any order with other TLV subfields. For example, an exemption request may be indicated by sending tag 947D, with length of 1, and value 0 if the exemption is not applied, and value 1 if the exemption is applied. Alternatively, the payment transaction processing request 125 may be in extensible markup language (XML), JavaScript object notation (JSON), and/or other structured data formats.

If the payment transaction is not exempt from the authentication requirement, the payment handling service 121 may send a strong authentication redirect 128 to the client computing device 106. The strong authentication redirect 128 then causes the client computing device 106 to access a uniform resource locator (URL) on the computing environment 107 that results in a strong authentication request 129 being sent from the computing environment 107 to the client computing device 106. For example, the strong authentication redirect 128 may correspond to a network page that includes an IFRAME element that refers to the URL. With user interfaces generated for or on behalf of payment issuers within IFRAME elements and potentially other implementations, the payment handling service 121 may be incapable of or otherwise restricted from modifying the content of the user interfaces. As will be described, the strong authentication redirect 128 may include user interface elements that recommend or instruct a user on how the payee entity associated with the payment transaction can be designated as a trusted beneficiary, thereby avoiding SCA for future transactions with the particular payment instrument and the payee entity designated as a trusted beneficiary.

It is noted that the strong authentication challenge corresponding to the strong authentication redirect 128 is different from authentication performed by the payment handling service 121 or the merchant or payee entity. Indeed, for a given payment transaction, the merchant or payee entity may still initiate strong authentication challenges via the authentication service 115 as deemed necessary by the merchant or payee entity and the risk management service 119. However, the strong authentication challenge associated with the strong authentication redirect 128 is performed or generated on behalf of the payment issuer, regardless of whether the merchant or payee entity deem such an authentication challenge necessary.

The client computing device 106 is representative of a plurality of client devices that may be coupled to the network 109. The client computing device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client computing device 106 may include a display 150. The display 150 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client computing device 106 may be configured to execute various applications such as a client application 152 and/or other applications. The client application 152 may be executed in a client computing device 106, for example, to access network content served up by the computing environment 103 and/or other servers, thereby rendering a user interface 154 on the display 150. To this end, the client application 152 may comprise, for example, a browser, a dedicated application, etc., and the user interface 154 may comprise a network page, an application screen, etc. The client computing device 106 may be configured to execute applications beyond the client application 152 such as, for example, email applications, social networking applications, word processors, spreadsheets, and/or other applications.

The computing environment 107 may be operated by or on behalf of a payment acquirer and/or payment issuer, which may include banks and other financial institutions, payment card issuers, payment gateways, and so forth. The computing environment 107 may comprise, for example, a server computer or any other system providing computing capability. Alternatively, the computing environment 107 may employ a plurality of computing devices that may be arranged, for example, in one or more server banks or computer banks or other arrangements. Such computing devices may be located in a single installation or may be distributed among many different geographical locations. For example, the computing environment 107 may include a plurality of computing devices that together may comprise a hosted computing resource, a grid computing resource, and/or any other distributed computing arrangement. In some cases, the computing environment 107 may correspond to an elastic computing resource where the allotted capacity of processing, network, storage, or other computing-related resources may vary over time.

Various applications and/or other functionality may be executed in the computing environment 107 according to various embodiments. Also, various data may be stored in a data store that is accessible to the computing environment 107. The components executed on the computing environment 107, for example, include a payment issuer system 170 and other applications, services, processes, systems, engines, or functionality not discussed in detail herein. The payment issuer system 170 is executed to receive payment transaction processing requests 125 from the computing environment 103 or other merchants and to authorize or deny the requests. In some implementations, the payment transaction processing requests 125 may be received by the payment issuer system 170 by way of a payment acquirer, a payment gateway, or some other intermediate server that may be operated by a different entity than the payment issuer. This intermediate server can then forward the payment transaction processing requests 125 to the payment issuer system 170. The payment issuer system 170 may confirm that funds or credit is available for a given payment instrument such that the payment transaction is authorized to proceed. Further, the payment issuer system 170 may perform its own risk analysis to determine whether to authorize or deny the payment transaction.

In various implementations, the payment issuer system 170 may include one or more access control services that may be configured to perform strong customer authentication by sending a strong authentication request 129 to the client computing device 106. For example, the client computing device 106 may be redirected by the payment handling service 121 during a checkout workflow via the strong authentication redirect 128 to perform strong authentication with the payment issuer system 170. In one implementation, the payment handling service 121 may use an IFRAME element within a hypertext markup language (HTML) page to display the strong authentication request 129.

In the strong authentication request 129, the user may be asked to respond to an authentication challenge additional to previous challenges via the authentication service 115 in the computing environment 103. If a strong authentication request 129 is sent, approval of the payment transaction may be contingent upon the user successfully responding to the authentication challenge. The strong authentication request 129 may be generated according to a protocol such as third-party secure (3DS) 2.0. Otherwise, the payment handling service 121 may request an exemption to the authentication requirement, and the payment issuer system 170 may choose to grant the exemption or deny the transaction.

The strong authentication request 129 may include a component that when selected causes the payee entity associated with the transaction to be designated as a trusted beneficiary to avoid one or more SCA challenges for future payment transactions. For instance, a checkbox may be present for the user to designate the payee entity as a trusted beneficiary. The payment issuer system 170 may be configured to send a trusted beneficiary status 173 back to the payment handling service 121, where the trusted beneficiary status 173 indicates that the payee entity has or has not been designated a trusted beneficiary for the particular payment instrument. The trusted beneficiary status 173 may be returned to the payment handling service 121 as part of a confirmation that the payment transaction has been processed. Alternatively, the trusted beneficiary status 173 may be sent to the payment handling service 121 in response to a user creating or removing a designation of the payee entity as being a trusted beneficiary for the payment instrument through an application or network site associated with the payment issuer system 170.

Figure 2:
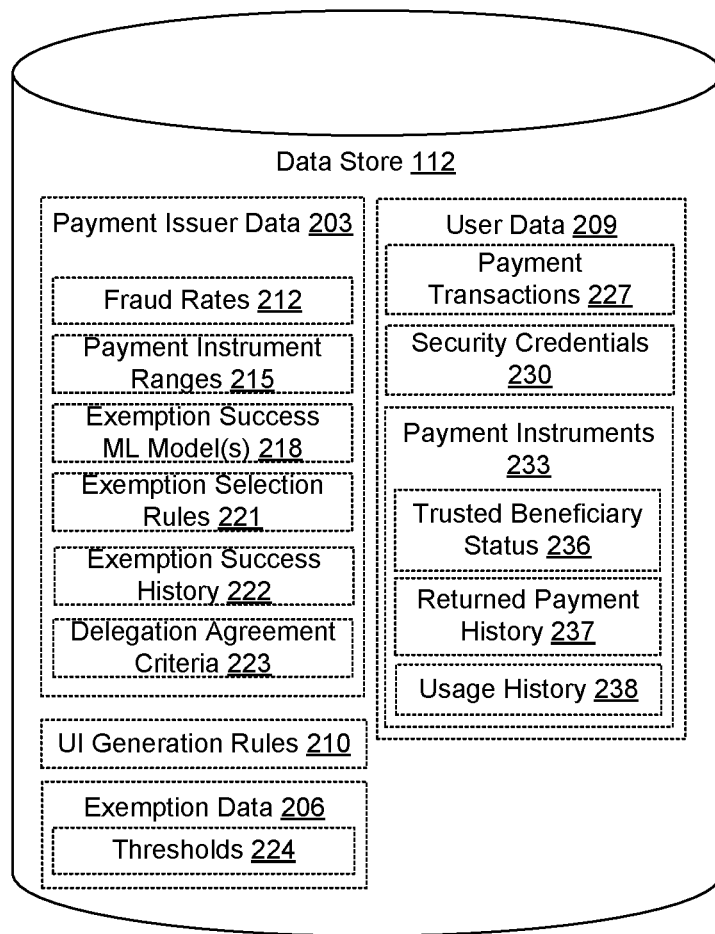
FIG. 2 is a drawing of a data store used in a computing environment in the networked environment of FIG. 1 according to various embodiments of the present disclosure.

Moving on to FIG. 2, shown is an example of the data store 112 from the computing environment 103 (FIG. 1). The data stored in the data store 112 includes, for example, payment issuer data 203, exemption data 206, user data 209, user interface generation rules 210, and potentially other data. The payment issuer data 203 includes data with respect to individual payment issuers of potentially a plurality of payment issuers. The payment issuer data 203 may include fraud rates 212, payment instrument ranges 215, an exemption success machine learning model 218, exemption selection rules 221, exemption success history 222, delegation agreement criteria 223, and/or other data.

The fraud rates 212 indicate rates of chargebacks or other types of payment instrument fraud for payment instruments issued by the payment issuer. The fraud rates 212 may be significant in determining which payment transactions are eligible for exemption. For example, different transaction value thresholds or tiers of exemption eligibility may be established for different ranges of fraud rates 212.

The payment instrument ranges 215 are used to identify a particular payment issuer from the payment instrument data. For example, a payment card number may include a bank identification number (BIN) that corresponds to a particular payment issuer.

Each of the exemption success machine learning model(s) 218 corresponds to a machine learning model used to predict the likelihood of success for a request for a particular type of exemption for a particular payment transaction processing request 125 (FIG. 1). The exemption success machine learning model 218 is specific to a particular payment issuer and trained on the outcome of past exemption requests for a particular exemption for payment transactions with the particular payment issuer in correlation with one or more characteristics of the corresponding user and/or one or more characteristics of the corresponding transaction. In various embodiments, the exemption success machine learning model 218 may employ a regression model, a clustering analysis, a random forest technique, a supervised learning technique, and/or other machine learning techniques.

For example, training data may be fed into a regression model, a clustering analysis, a random forest model, or a supervised learning model. The regression model may be used to estimate the relationships between the different signals or characteristics associated with the payment transactions and the end results of the exemption being approved or denied. The clustering analysis may be used to identify types or clusters of payment transactions for which the exemption is approved or denied. Supervised learning may be used for payment instruments issued by a payment issuer by training the pattern that is observed across the payment instruments issued by the payment issuer. A random forest technique may be used in the initial data analysis while building data sets for payment transactions happening for the payee entity or merchant.

The exemption selection rules 221 can be used by the exemption selection engine 122 (FIG. 1) to determine whether to include an exemption request and for what type of exemption for a particular payment transaction processing request 125 given characteristics of the payment transaction and/or characteristics of the user. The exemption selection rules 221 are specific to a particular payment issuer. The exemption selection rules 221 can be automatically generated based on the exemption success machine learning model 218 and/or on the basis of trial-and-error testing of exemption requests for a particular payment issuer. Alternatively, or additionally, one or more of the exemption selection rules 221 may be manually configured. For example, the exemption selection rules 221 may be configured to prioritize a grandfathered recurring transaction exemption over a transaction risk assessment exemption, which in turn is prioritized over a delegation exemption.

The exemption data 206 describes various exemptions to authentication requirements, including the transaction risk assessment (TRA) exemption, the trusted beneficiary exemption, the grandfathered recurring transaction exemption, the delegation exemption, the fixed amount subscription exemption, the low value transaction exemption, the payee entity-initiated transaction exemption, a regulation-not-enforced exemption, or other types of exemptions. The exemption data 206 may include one or more thresholds 224, which may control whether an exemption is available. For example, an exemption may be available for transactions having a value at or below a certain threshold 224, but not available for values exceeding the threshold 224. Multiple thresholds 224 may be established. For example, a high value threshold 224 may be established for merchants associated with a relatively high fraud rate 212, while a low value threshold 224 may be established for merchants associated with a relatively low fraud rate 212.

The exemption success history 222 may record whether particular types of exemptions are successful for particular payment transactions. This empirically observed data may be used to train the exemption success machine learning models 218 and/or to develop exemption selection rules 221. In some embodiments, the exemption success history 222 may be shared with third parties and/or aggregated from third-party exemption success histories 222.

The delegation agreement criteria 223 contain criteria agreed to by a payee entity and the payment issuer in allowing authentication to be delegated to the payee entity under the delegation exemption. It is noted that the payee entity may not have agreements to use the delegation exemption with every payment issuer. Further, the delegation agreement criteria 223 may differ for different payment issuers. For example, one payment issuer may not allow the payee entity to use delegated authentication for transactions exceeding a value threshold, while another payment issuer may not have a value threshold limitation.

The user data 209 includes data associated with user accounts. The user data 209 may include payment transactions 227, security credentials 230, payment instruments 233, and/or other data. The payment transactions 227 are each associated with a certain value and a payment instrument 233, and may be used to purchase one or more items, rent one or more items, donate to an individual or group, pay a bill, pay another person, and so forth. The security credentials 230 are used to authenticate users and can include passwords, one-time passwords, answers to knowledge-based questions, voice recognition profiles, face recognition profiles, fingerprint recognition profiles, and so forth.

The payment instruments 233 correspond to methods for making an electronic payment. Such payment instruments 233 can include bank accounts, electronic wallets, stored value cards, credit cards, debit cards, cryptocurrency, and so forth. Each payment instrument 233 can be associated with a trusted beneficiary status 236 indicating whether the user has designated one or more payee entities associated with the computing environment 103 as trusted beneficiaries to avoid one or more SCA challenges associated with future payment transactions 227.

Each payment instrument 233 can be associated with a returned payment history 237 indicating instances of returned payments associated with the payment instrument. For example, returned payments may correspond to chargebacks, bounced checks for insufficient funds, and so forth. Each returned payment documented in the returned payment history 237 may be associated with a corresponding time or date.

Each payment instrument 233 may also be associated with a usage history 238 documenting when the payment instrument 233 was used for a payment transaction 227. The usage history 238 may indicate a time or date of first use and times or dates of successfully processed payment transactions 227.

The user interface generation rules 210 can configure how various user interfaces 154 (FIG. 1) are generated by the payment handling service 121 (FIG. 1) and/or other components executed in the computing environment 103. For example, the user interface generation rules 210 may specify that payment instruments 233 designating a payee entity as a trusted beneficiary should be given differentiated status within a user interface 154 that facilitates a user selection of the payment instrument 233 from a listing of potentially multiple payment instruments 233 associated with the user account. Further, the user interface generation rules 210 may specify that a recommendation to designate a trusted beneficiary be included in a user interface 154 corresponding to the strong authentication redirect 128 (FIG. 1).

Figure 3A:
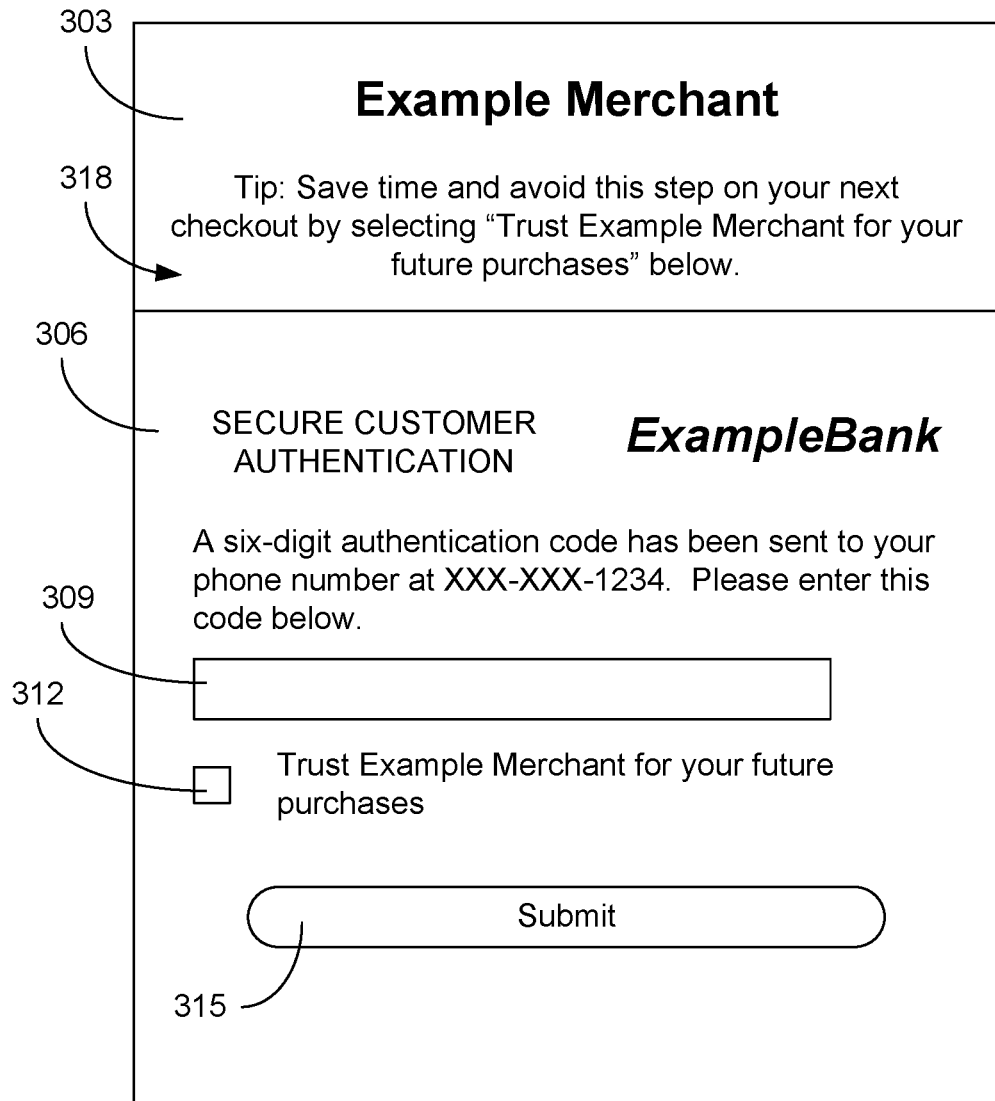
FIGS. 3A-3C are drawings of example user interfaces rendered by a client computing device in the networked environment of FIG. 1 according to various embodiments of the present disclosure.

Referring next to FIG. 3A, shown is an example user interface 300 rendered by a client application 152 (FIG. 1) executed in a client computing device 106 (FIG. 1) in a networked environment 100 (FIG. 1). The example user interface 300 corresponds to a strong authentication redirect 128 (FIG. 1) that has resulted in a strong authentication request 129 (FIG. 1). The example user interface 300 includes a user interface 303 generated by the payee entity in the strong authentication redirect 128 and a user interface 306 generated by the payment issuer system 170 (FIG. 1) as part of the strong authentication request 129. In one implementation, the user interface 306 is an iframe element within the user interface 303, which causes the client application 152 to request a URL hosted by or on behalf of the payment issuer system 170.

The user interface 306 includes an authentication challenge to verify the user's identity. In this case, the payment issuer system 170 has caused a one-time password to be sent to the user's phone number in a text message. The phone number is registered with the payment issuer in association with the payment instrument 233 (FIG. 2). A form field 309 is provided for the user to enter the one-time password received via the registered phone number.

The user interface 306 also includes a component 312 that when selected causes the payee entity (in this case, "Example Merchant") to be designated a trusted beneficiary for future payment transactions 227 (FIG. 2) involving this payment instrument 233 and/or potentially other payment instruments 233 issued to the user through the same payment issuer. In this case, the component 312 is a checkbox, but the component 312 may correspond to buttons, sliders, radio buttons, links, and/or other types of user input components in other examples. In some implementations, the component 312 may be preselected. In some scenarios, the component 312 may be preselected for some payee entities and payment transactions 227 but not others, potentially in response to a determination of risk by the payment issuer system 170. A submit component 315 causes the form to be submitted to the payment issuer system 170 for verification.

In this example, the user interface 303 also includes a recommendation 318 containing information that recommends enabling the component 312 to designate the payee entity as a trusted beneficiary. The payee entity may have control over the user interface 303 but not the content of the user interface 306, which is generated by the payment issuer system 170. As such, the payee entity may wish to inform the user of the positive consequences of designating the payee entity as a trusted beneficiary, e.g., faster checkout with less friction. The recommendation 318 in other examples may be shown as a pop-up window, a pop-over window, a tool tip, and/or in other formats. In some cases, the payee entity may include client-side code in the user interface 303 that causes the component 312 to be preselected, or to insert additional information or a recommendation 318 adjacent to the component 312.

Figure 3B:
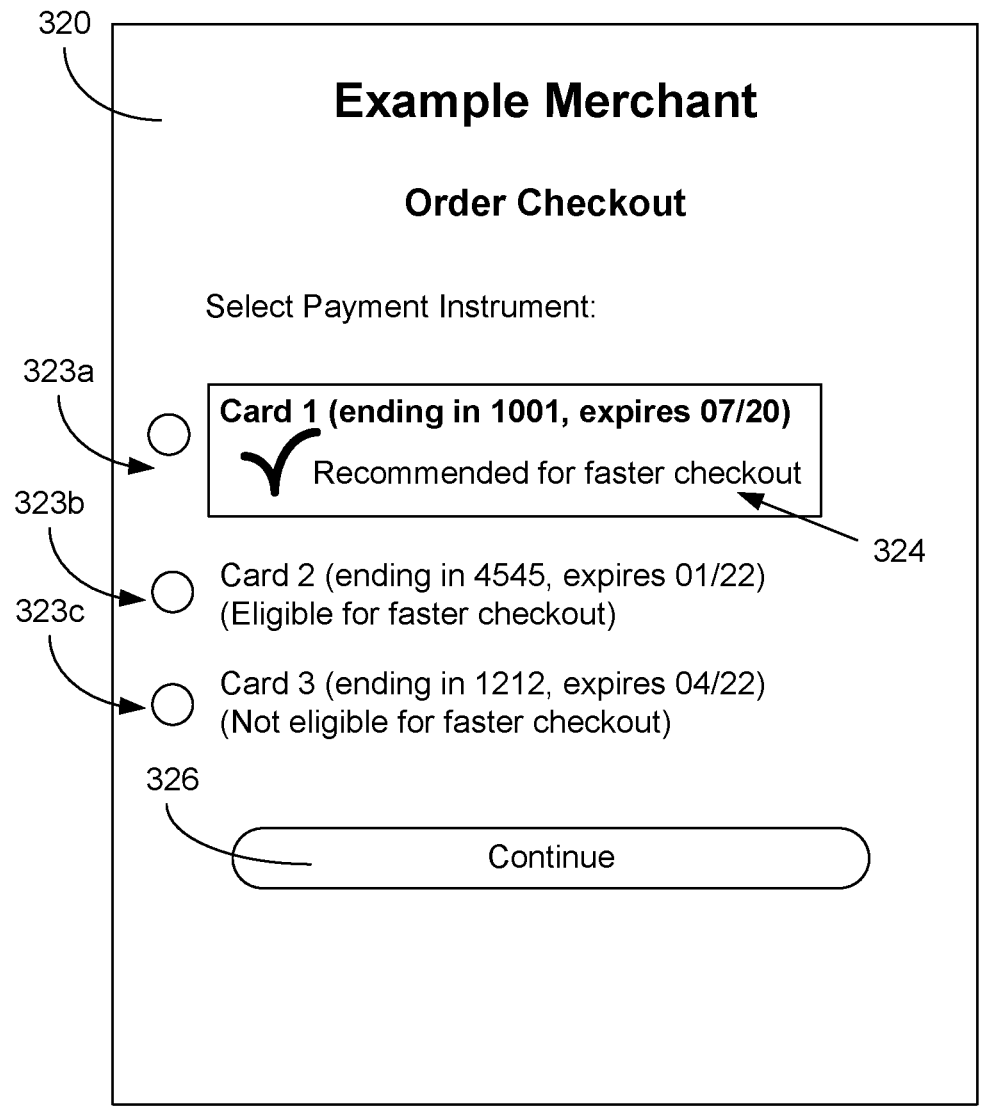

Turning now to FIG. 3B, shown is an example user interface 320 rendered by a client application 152 (FIG. 1) executed in a client computing device 106 (FIG. 1) in a networked environment 100 (FIG. 1). The example user interface 320 corresponds to an order checkout page generated by the payment handling service 121 (FIG. 1) or the electronic commerce system 117 (FIG. 1). The example user interface 320 allows the user to select from multiple payment instruments 233 (FIG. 2) associated with the user's account by way of a listing of a plurality of representations 323 of the payment instruments 233.

This example includes three representations 323a, 323b, and 323c corresponding to three different payment instruments 233. The representations 323 may include information that identifies the particular corresponding payment instrument 233, including a bank or payment network logo or name, a short name assigned to the payment instrument 233, a portion of a payment instrument number, an expiration date, and/or other information. The representations 323 may be prioritized or ordered in the user interface 320 based on various criteria. For example, a user-selected default payment instrument 233 may be prioritized first, followed by payment instruments 233 that provide cash back, points, or some other benefit to the user.

Moreover, payment instruments 233 may be prioritized on the basis of the payee entity being designated as a trusted beneficiary for the particular payment issuer. In this regard, the payment instrument 233 associated with a trusted beneficiary designation may be shown first in the list, with a differentiation 324 including bold text, with a badge icon like a checkmark, with text such as "recommended for faster checkout," and/or with other characteristics that differentiate the payment instrument 233 associated with a trusted beneficiary designation. In this case, the representation 323a corresponds to a payment instrument 233 associated with a trusted beneficiary designation, while the representations 323b and 323c do not. Upon selecting a particular representation 323 (e.g., by clicking on the representation 323, selecting a corresponding radio button, etc.) and selecting the continue component 326, the corresponding payment instrument 233 is used for the payment transaction 227 (FIG. 2).

Also, in this example, the user interface 320 indicates via the representation 323b that a corresponding payment instrument 233 is eligible for a trusted beneficiary designation (e.g., "eligible for faster checkout") and indicates via the representation 323c that a corresponding payment instrument 233 is not eligible for a trusted beneficiary designation (e.g., "not eligible for faster checkout"). Similarly to the representation 323a, the representations 323b and 323c may include appropriate badge icons, textual descriptions, highlighting, and/or other characteristics that differentiate the statuses of the corresponding payment instruments 233. Such differentiation may persuade users to select payment instruments 233 that are eligible for the trusted beneficiary designation over those which are not eligible. The ranking or display of the payment instruments 233 in the user interface 320 may depend on these criteria, such that payment instruments 233 not eligible for trusted beneficiary designation are ranked lower or hidden under payment instruments 233 that are eligible for trusted beneficiary designation, which may themselves be ranked lower or hidden under payment instruments 233 that already have the trusted beneficiary designation.

Although the examples of FIG. 3B show prioritization or preferred status being conveyed to payment instruments 233 that have or are eligible for the trusted beneficiary designation, in other examples, payment instruments 233 that are eligible for delegated authentication may also be prioritized or preferred. With delegated authentication being supported by a particular payment issuer, SCA is performed by the payee entity instead of the payment issuer, which can be considered a better user experience than SCA performed by the payment issuer. As such, a user may wish to select payment instruments 233 that support the delegation exemption over those that do not. Badge icons, text descriptions, and so forth may indicate that these eligible payment instruments 233 have a streamlined checkout experience. However, payment instruments 233 having the trusted beneficiary designation may be prioritized over payment instruments 233 that only have delegated authentication eligibility.

Figure 3C:
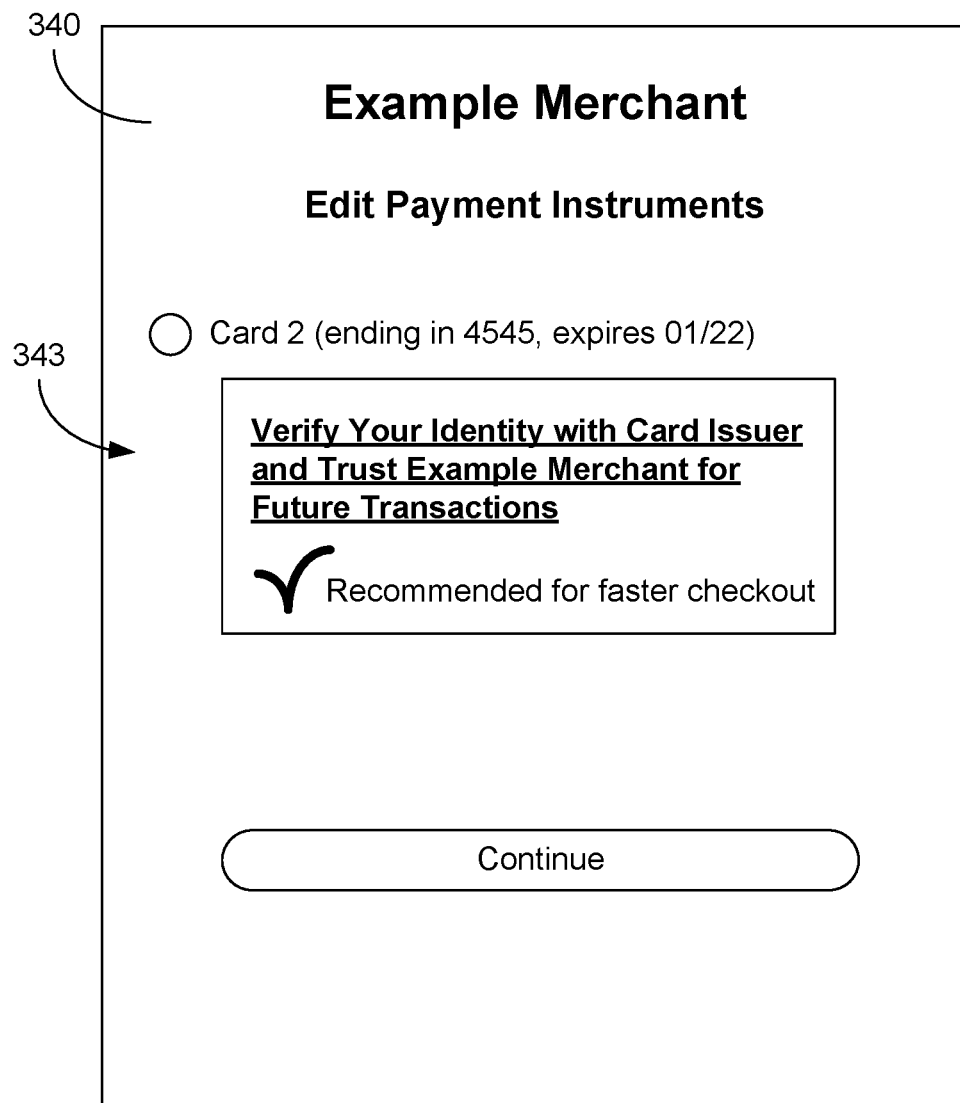

Moving on to FIG. 3C, shown is an example user interface 340 rendered by a client application 152 (FIG. 1) executed in a client computing device 106 (FIG. 1) in a networked environment 100 (FIG. 1). The example user interface 340 corresponds to a payment instrument management page generated by the payment handling service 121 (FIG. 1) or the electronic commerce system 117 (FIG. 1). The example user interface 340 allows the user to select a component 343 to optionally undergo an authentication challenge by the payment issuer system 170 (FIG. 1) for a payment instrument 233 outside of the checkout workflow for a payment transaction 227. The component 343 may recommend the verification in conjunction with trusted beneficiary designation to speed future checkouts, and in some examples, store credit or another incentive may be offered to users to undergo the verification and designate the payee entity as a trusted beneficiary.

Figure 4A:
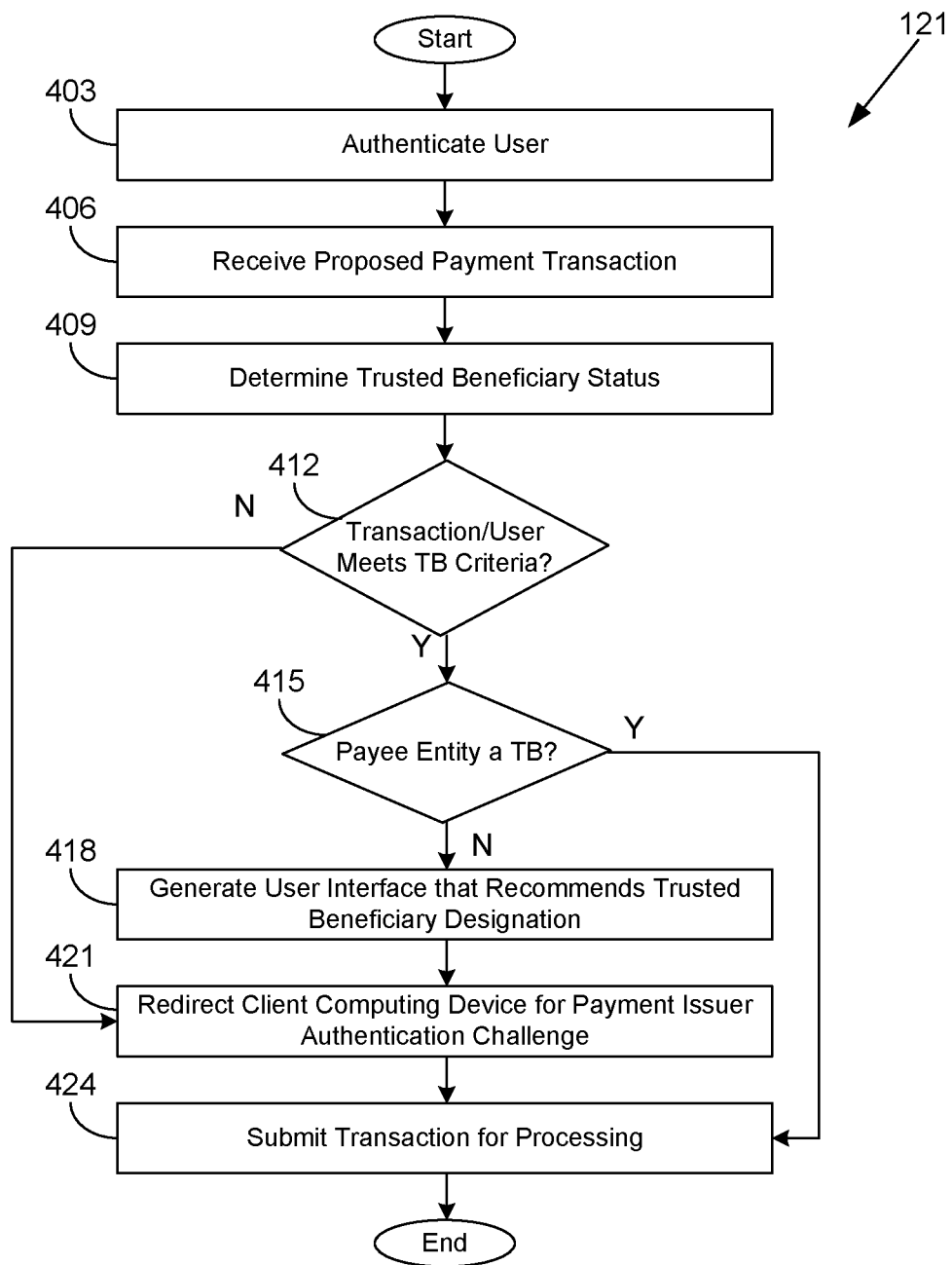
FIGS. 4A-4B are flowcharts illustrating examples of functionality implemented as portions of a payment handling system executed in a computing environment in the networked environment of FIG. 1 according to various embodiments of the present disclosure.

Referring next to FIG. 4A, shown is a flowchart that provides one example of the operation of a portion of the payment handling service 121 according to various embodiments. It is understood that the flowchart of FIG. 4A provides merely an example of the many different types of functional arrangements that may be employed to implement the operation of the portion of the payment handling service 121 as described herein. As an alternative, the flowchart of FIG. 4A may be viewed as depicting an example of elements of a method implemented in the computing environment 103 (FIG. 1) according to one or more embodiments.

Beginning with box 403, the payment handling service 121 authenticates the user at a client computing device 106 (FIG. 1) to a desired authentication level using the authentication service 115 (FIG. 1). The user may have to supply one or more security credentials 230 (FIG. 2) to answer one or more authentication challenges.

In box 406, the payment handling service 121 receives information regarding a proposed payment transaction 227 (FIG. 2) for a payee entity. For example, the user may have requested to place an order for an item via an electronic commerce system 117 (FIG. 1), donate a sum of money, pay a bill, or perform some other transaction. In some cases, the payment handling service 121 may handle payment transactions 227 for multiple payee entities, and the payment transaction 227 identifies a particular one of the payee entities. The proposed payment transaction 227 also identifies a particular payment instrument 233 (FIG. 2) associated with the user's account.

In box 409, the payment handling service 121 identifies a trusted beneficiary status 236 (FIG. 2) associated with the payment instrument 233. For example, the payee entity may or may not be designated as a trusted beneficiary. In box 412, the payment handling service 121 determines whether the payment transaction 227 and/or the user meet criteria in the exemption data 206 (FIG. 2) for the trusted beneficiary exemption to strong customer authentication. For example, the payment transaction 227 may have a value exceeding a maximum threshold 224 (FIG. 2) established for the trusted beneficiary exemption. As another example, the payment instrument 233 may be associated with an account having multiple users (e.g., one or more parent users and one or more child users in a household), and controls such as parental controls may cause the trusted beneficiary exemption not to apply for payment transactions 227 associated with particular users (e.g., a child user). If the payment transaction 227 meets the trusted beneficiary criteria, the payment handling service 121 continues from box 412 to box 415.

In box 415, the payment handling service 121 determines whether the payee entity is designated as a trusted beneficiary from the trusted beneficiary status 236. If the payee entity is not designated as a trusted beneficiary, the payment handling service 121 continues from box 415 to box 418.

In box 418, the payment handling service 121 generates a user interface 303 (FIG. 3A) that recommends the trusted beneficiary designation for the payee entity. In box 421, the payment handling service 121 redirects the client computing device 106 for a payment issuer authentication challenge via a strong authentication redirect 128 (FIG. 1). In box 424, the payment handling service 121 submits the payment transaction 227 for processing via a payment transaction processing request 125 (FIG. 1). Thereafter, the operation of the portion of the payment handling service 121 ends.

If the payment handling service 121 instead determines in box 412 that the payment transaction 227 or the user does not meet the trusted beneficiary exemption criteria, the payment handling service 121 proceeds from box 412 to box 421 and redirects the client computing device 106 for a payment issuer authentication challenge via a strong authentication redirect 128. In box 424, the payment handling service 121 submits the payment transaction 227 for processing via a payment transaction processing request 125 (FIG. 1). Thereafter, the operation of the portion of the payment handling service 121 ends.

If the payment handling service 121 instead determines in box 415 that the payee entity is a trusted beneficiary, the payment handling service 121 instead proceeds from box 415 to box 424 and submits the payment transaction 227 for processing via a payment transaction processing request 125. This is performed without an authentication challenge by the payment issuer, and in one embodiment, no strong authentication redirect 128 is generated. In another embodiment, a strong authentication redirect 128 may be generated simply to verify that the trusted beneficiary exemption is approved, where the result from the payment issuer system 170 is a nullity or otherwise does not include the authentication challenge from the payment issuer. In some cases, the payment transaction 227 may fail because the payment issuer does not support the trusted beneficiary exemption for the payment transaction 227, in which case processing may be reattempted with strong customer authentication. Thereafter, the operation of the portion of the payment handling service 121 ends.

Figure 4B:
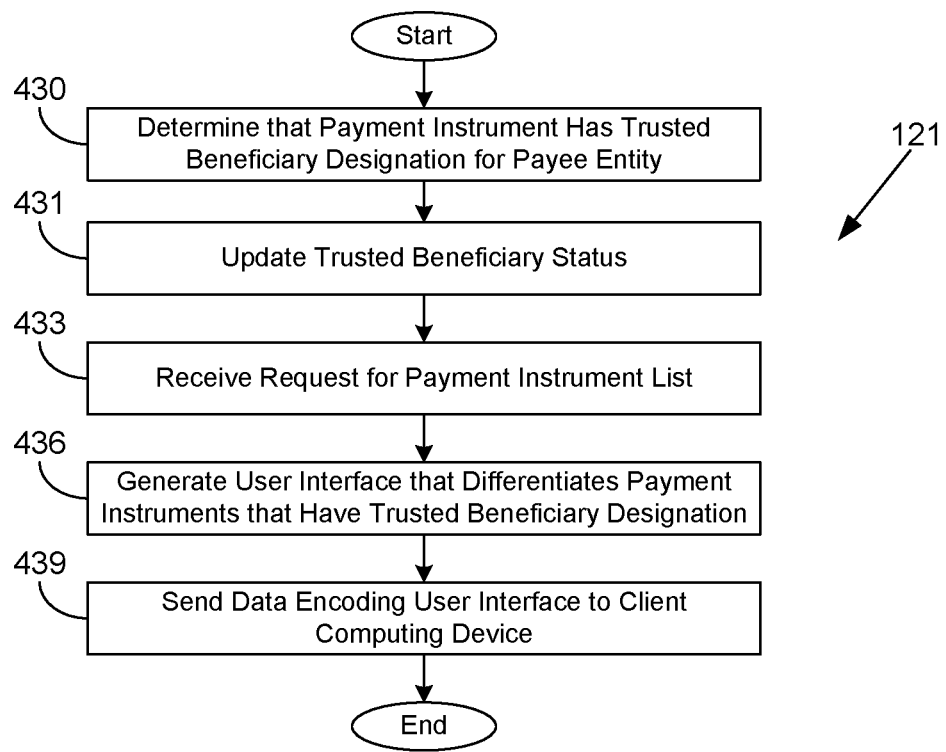

Moving on to FIG. 4B, shown is a flowchart that provides one example of the operation of another portion of the payment handling service 121 according to various embodiments. It is understood that the flowchart of FIG. 4B provides merely an example of the many different types of functional arrangements that may be employed to implement the operation of the portion of the payment handling service 121 as described herein. As an alternative, the flowchart of FIG. 4B may be viewed as depicting an example of elements of a method implemented in the computing environment 103 (FIG. 1) according to one or more embodiments.

Beginning with box 430, the payment handling service 121 determines that a payment instrument 233 (FIG. 2) is associated with a trusted beneficiary designation for a payee entity supported by the payment handling service 121. In an implementation using 3DS 2.0, the payment handling service 121 may use AReq messages to check trusted beneficiary status 173 (FIG. 1). For example, the payment handling service 121 may receive a trusted beneficiary status 173 update via an application programming interface (API) in conjunction with submitting a payment transaction 227 (FIG. 2) for processing by a payment issuer system 170 (FIG. 1). Alternatively, the user may have invoked a strong customer authentication via a user interface 340 (FIG. 3C) separately from a payment transaction 227 simply to whitelist the payee entity as a trusted beneficiary. The user may also update trusted beneficiary designations via an application or network site of the payment issuer. These situations may involve push notifications sent by the payment issuer system 170. A trusted beneficiary designation from one payment instrument may be transferred to another payment instrument in cases where a payment instrument is reissued. In some cases, a previously existing trusted beneficiary designation for a payment instrument 233 may be removed.

In box 431, the payment handling service 121 updates the trusted beneficiary status 236 (FIG. 2) associated with the payment instrument 233 recorded in the data store 112 (FIG. 1).

In box 433, the payment handling service 121 receives a request for a list of payment instruments 233 available for a user account for use in paying a payee entity. For example, the user may be in a checkout workflow and may need to select a particular payment instrument 233 for use in paying for an order.

In box 436, the payment handling service 121 generates a user interface 320 (FIG. 3B) that differentiates payment instruments 233 that currently have the trusted beneficiary designation for the payee entity. For example, the user interface 320 may indicate the preferred status of the payment instruments 233 that have the trusted beneficiary designation for the payee entity. The preferred status may be indicated by a badge icon and/or a textual description. The payment instruments 233 that have the trusted beneficiary designation may be prioritized ahead in the listing of other payment instruments 233 that do not have the trusted beneficiary designation. In some cases, representations of the payment instruments 233 without the trusted beneficiary designation may be hidden or minimized in the listing. In some scenarios, a payment instrument 233 with a trusted beneficiary designation may be automatically selected as a default payment instrument 233. In box 439, the payment handling service 121 sends data encoding the user interface 320 to the client computing device 106 (FIG. 1) via the network 109 (FIG. 1) for rendering by the client application 152 (FIG. 1). Thereafter, the operation of the portion of the payment handling service 121 ends.

Figure 5A:
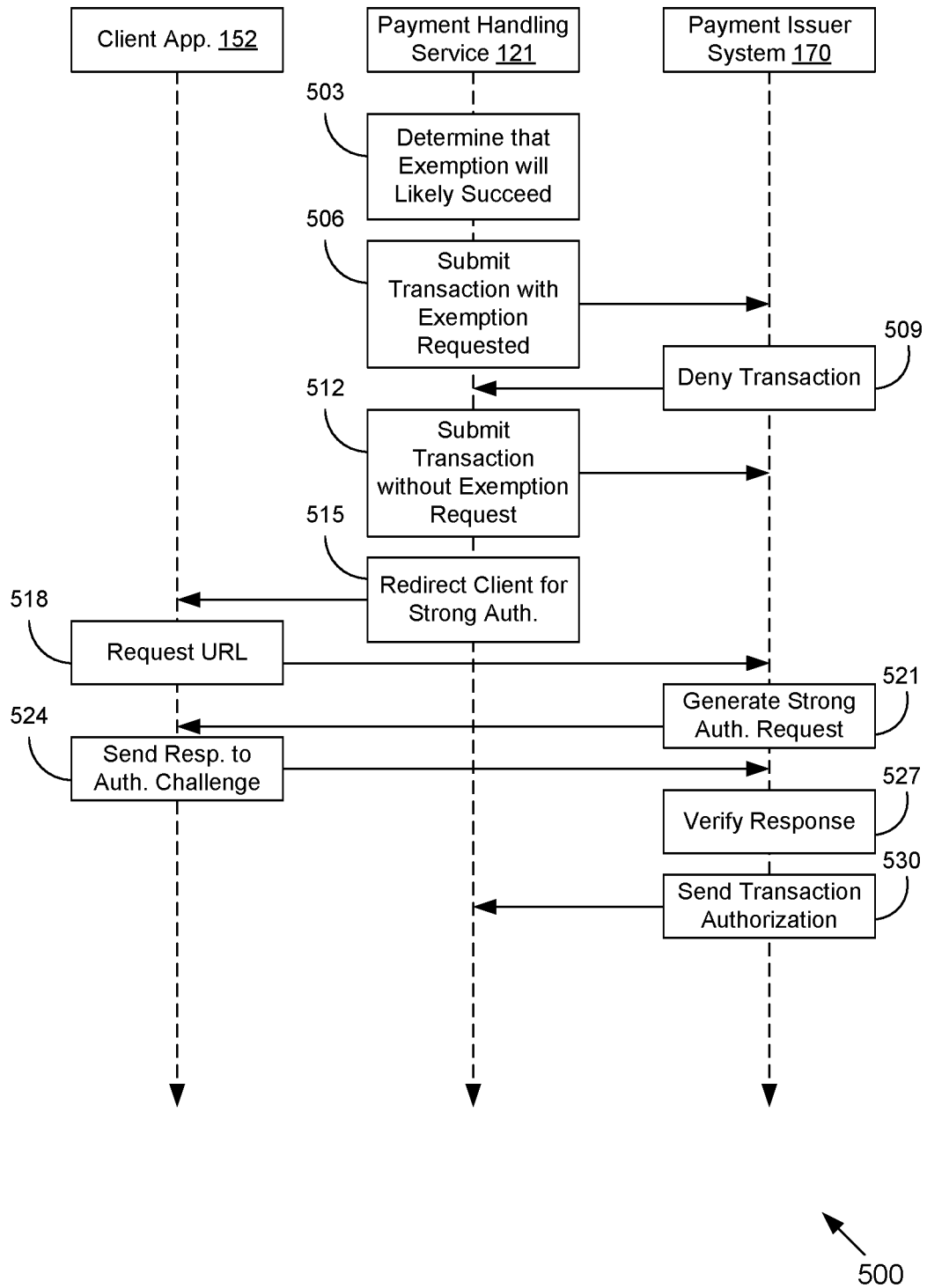
FIGS. 5A-5C and 6 are sequence diagrams that provide examples of the interaction among the client application, the payment handling service, and the payment issuer system in the networked environment of FIG. 1 according to various embodiments of the present disclosure.

Referring next to FIG. 5A, shown is a sequence diagram 500 that provides an example of the interaction among the client application 152, the payment handling service 121, and the payment issuer system 170. It is understood that the sequence diagram 500 of FIG. 5A provides merely an example of the many different types of functional arrangements that can be employed to implement the operation of the depicted portions of the client application 152, the payment handling service 121, and the payment issuer system 170. As an alternative, the sequence diagram 500 of FIG. 5A can be viewed as depicting an example of elements of a method implemented within the networked environment 100 (FIG. 1).

Beginning with box 503, the payment handling service 121 determines that for a given payment transaction 227 (FIG. 2), an exemption request is likely to succeed. For example, a value associated with the payment transaction 227 may be below a maximum threshold 224 (FIG. 2) for a fraud rate 212 (FIG. 2) associated with the corresponding payment issuer. Further, the risk score generated by a risk management service 119 (FIG. 1) may be below a maximum risk threshold for the exemption. Finally, the exemption selection engine 122 (FIG. 1) may make a prediction that the exemption request is likely to succeed based at least in part on an exemption success machine learning model 218 (FIG. 2), the exemption selection rules 221 (FIG. 2), and/or the exemption success history 222 (FIG. 2). In box 506, the payment handling service 121 submits a payment transaction processing request 125 (FIG. 1) via the network 109 (FIG. 1) to the payment issuer system 170 with an exemption request.

In box 509, the payment issuer system 170 denies the payment transaction 227 based at least in part on the exemption request. For example, the payment issuer system 170 may not support the specific exemption or the payment issuer system 170 may not allow the exemption on the basis of one or more parameters relating to the payment transaction 227 as specified in the payment transaction processing request 125. In one scenario, the payment issuer system 170 may have an internal risk evaluation system that may determine that the payment transaction 227 has an unacceptable risk without further authentication. The payment issuer system 170 sends data indicating the authorization denial back to the payment handling service 121 via the network 109 and possibly through one or more payment processing gateways.

In box 512, the payment handling service 121 submits the payment transaction processing request 125 again to the payment issuer system 170 but this time without the exemption request. In box 515, the payment handling service 121 redirects the client application 152 to complete a strong authentication process with the payment issuer system 170. To this end, the payment handling service 121 may send a strong authentication redirect 128 (FIG. 1) to the client application 152 via the network 109. The strong authentication redirect 128 may include network content with an iframe element.

In box 518, as a result of the strong authentication redirect 128, the client application 152 requests a uniform resource locator (URL) associated with the payment issuer system 170. In box 521, the payment issuer system 170 generates a strong authentication request 129 (FIG. 1), which is sent via the network 109 to the client application 152. The client application 152 may then render a user interface 154 (FIG. 1) on the display 150 (FIG. 1) to present the strong authentication request 129. The user may enter an answer to an authentication challenge in the strong authentication request 129, e.g., by answering a question via a voice interface, selecting one of multiple buttons in the user interface 154, entering text in a form, or by another approach.

In box 524, the client application 152 sends the response to the authentication challenge to the payment issuer system 170 via the network 109. In box 527, the payment issuer system 170 verifies that the response is a correct response to the authentication challenge. In box 530, the payment issuer system 170 sends a transaction authorization to the payment handling service 121. Thereafter, the sequence diagram 500 ends.

Figure 5B:
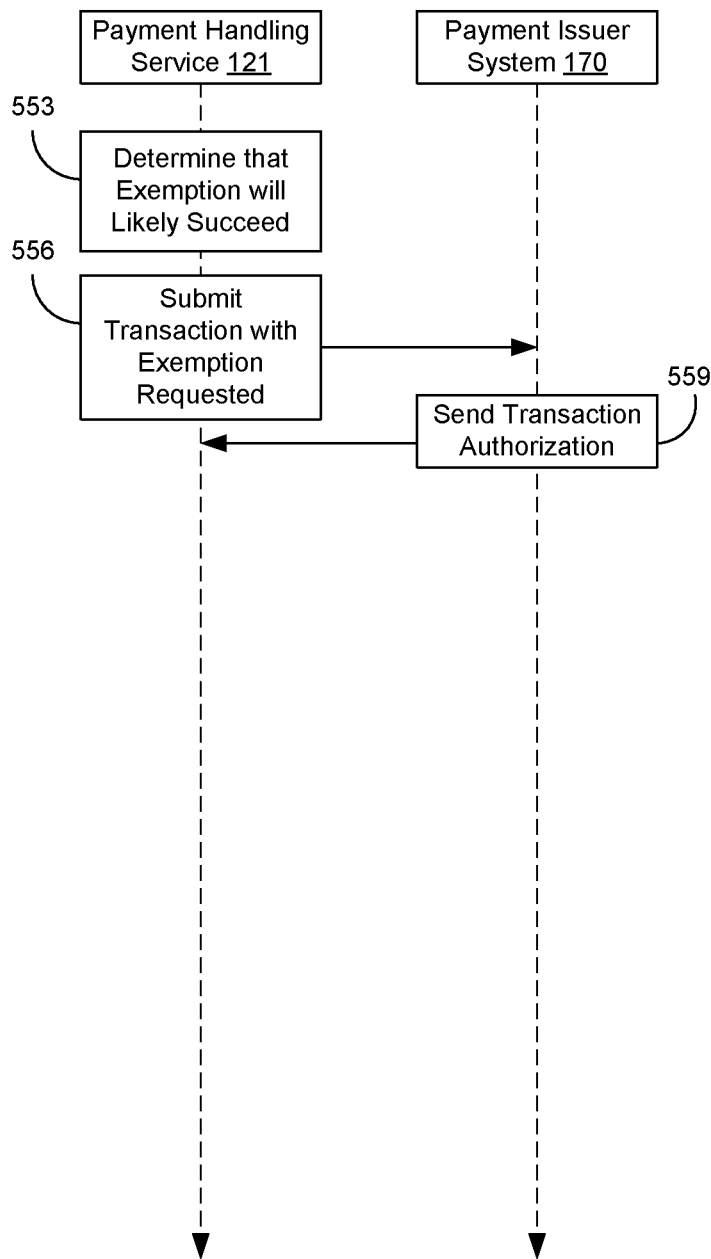

Continuing to FIG. 5B, shown is a sequence diagram 550 that provides another example of the interaction among the payment handling service 121 and the payment issuer system 170. It is understood that the sequence diagram 550 of FIG. 5B provides merely an example of the many different types of functional arrangements that can be employed to implement the operation of the depicted portions of the payment handling service 121, and the payment issuer system 170. As an alternative, the sequence diagram 550 of FIG. 5B can be viewed as depicting an example of elements of a method implemented within the networked environment 100 (FIG. 1).

Beginning with box 553, the payment handling service 121 determines that for a given payment transaction 227 (FIG. 2), an exemption request is likely to succeed. For example, a value associated with the payment transaction 227 may be below a maximum threshold 224 (FIG. 2) for a fraud rate 212 (FIG. 2) associated with the corresponding payment issuer. Further, the risk score generated by a risk management service 119 (FIG. 1) may be below a maximum risk threshold for the exemption. Finally, the exemption selection engine 122 (FIG. 1) may make a prediction that the exemption request is likely to succeed based at least in part on an exemption success machine learning model 218 (FIG. 2), the exemption selection rules 221 (FIG. 2), and/or the exemption success history 222 (FIG. 2). In box 556, the payment handling service 121 submits a payment transaction processing request 125 (FIG. 1) via the network 109 (FIG. 1) to the payment issuer system 170 with an exemption request.

In box 559, the payment issuer system 170 approves the exemption request so that no strong customer authentication is required, and then sends a transaction authorization to the payment handling service 121. Thereafter, the sequence diagram 550 ends.

Figure 5C:
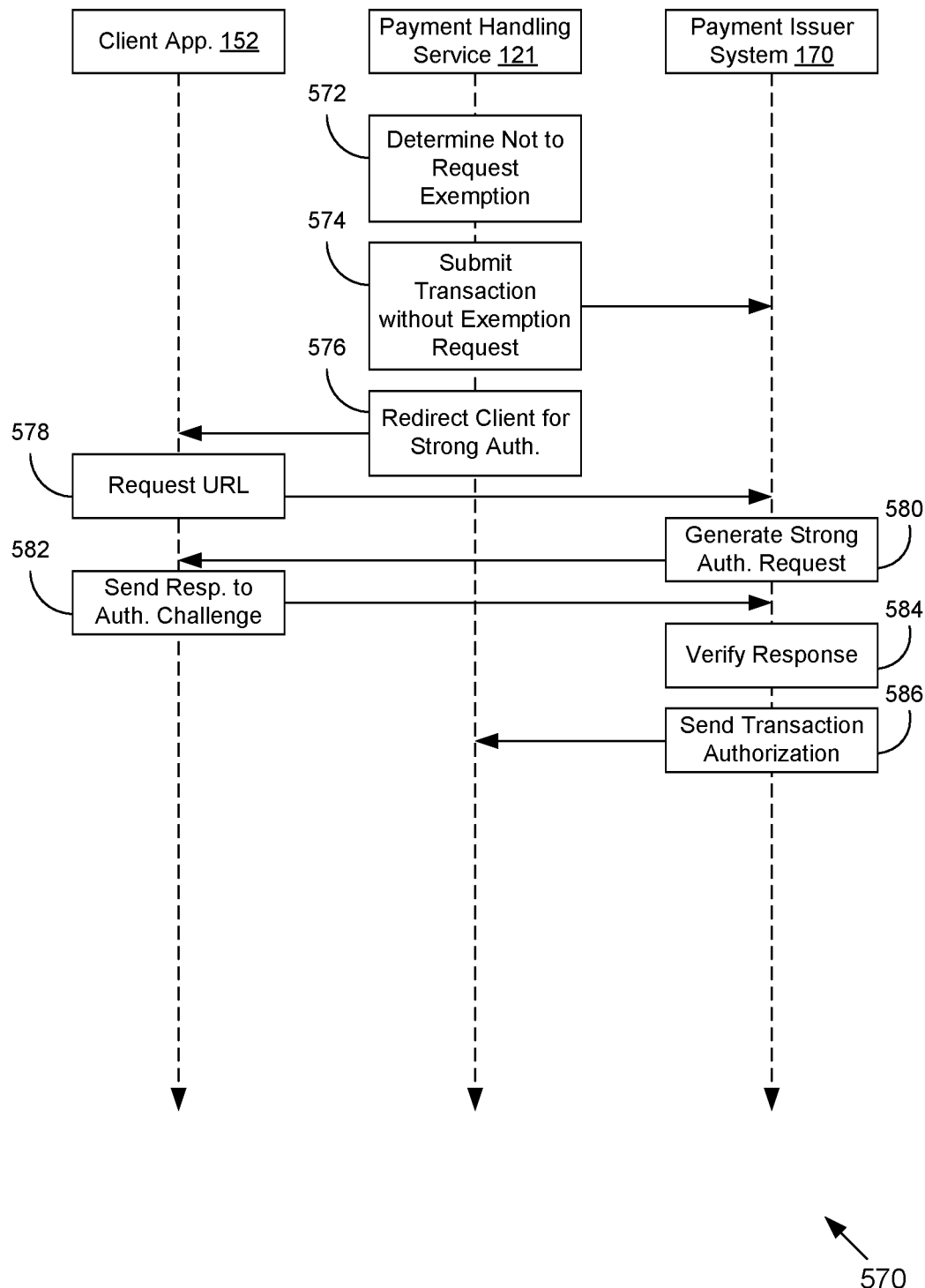

Moving on to FIG. 5C, shown is a sequence diagram 570 that provides another example of the interaction among the client application 152, the payment handling service 121, and the payment issuer system 170. It is understood that the sequence diagram 570 of FIG. 5C provides merely an example of the many different types of functional arrangements that can be employed to implement the operation of the depicted portions of the client application 152, the payment handling service 121, and the payment issuer system 170. As an alternative, the sequence diagram of FIG. 5C can be viewed as depicting an example of elements of a method implemented within the networked environment 100 (FIG. 1).

Beginning with box 572, the payment handling service 121 determines not to submit an exemption request for a given payment transaction 227 (FIG. 2). For example, a value associated with the payment transaction 227 may be above a maximum threshold 224 (FIG. 2) for a fraud rate 212 (FIG. 2) associated with the corresponding payment issuer. Further, the risk score generated by a risk management service 119 (FIG. 1) may be above a maximum risk threshold for the exemption. Finally, the exemption selection engine 122 (FIG. 1) may make a prediction that the exemption request is not likely to succeed based at least in part on an exemption success machine learning model 218 (FIG. 2), the exemption selection rules 221 (FIG. 2), and/or the exemption success history 222 (FIG. 2). In box 574, the payment handling service 121 submits a payment transaction processing request 125 (FIG. 1) via the network 109 (FIG. 1) to the payment issuer system 170 without an exemption request.

In box 576, the payment handling service 121 redirects the client application 152 to complete a strong authentication process with the payment issuer system 170. To this end, the payment handling service 121 may send a strong authentication redirect 128 (FIG. 1) to the client application 152 via the network 109. The strong authentication redirect 128 may include network content with an iframe element.

In box 578, as a result of the strong authentication redirect 128, the client application 152 requests a uniform resource locator (URL) associated with the payment issuer system 170. In box 580, the payment issuer system 170 generates a strong authentication request 129 (FIG. 1), which is sent via the network 109 to the client application 152. The client application 152 may then render a user interface 154 (FIG. 1) on the display 150 (FIG. 1) to present the strong authentication request 129. The user may enter an answer to an authentication challenge in the strong authentication request 129, e.g., by answering a question via a voice interface, selecting one of multiple buttons in the user interface 154, entering text in a form, or by another approach.

In box 582, the client application 152 sends the response to the authentication challenge to the payment issuer system 170 via the network 109. In box 584, the payment issuer system 170 verifies that the response is a correct response to the authentication challenge. In box 586, the payment issuer system 170 sends a transaction authorization to the payment handling service 121. Thereafter, the sequence diagram 570 ends.

Figure 6:
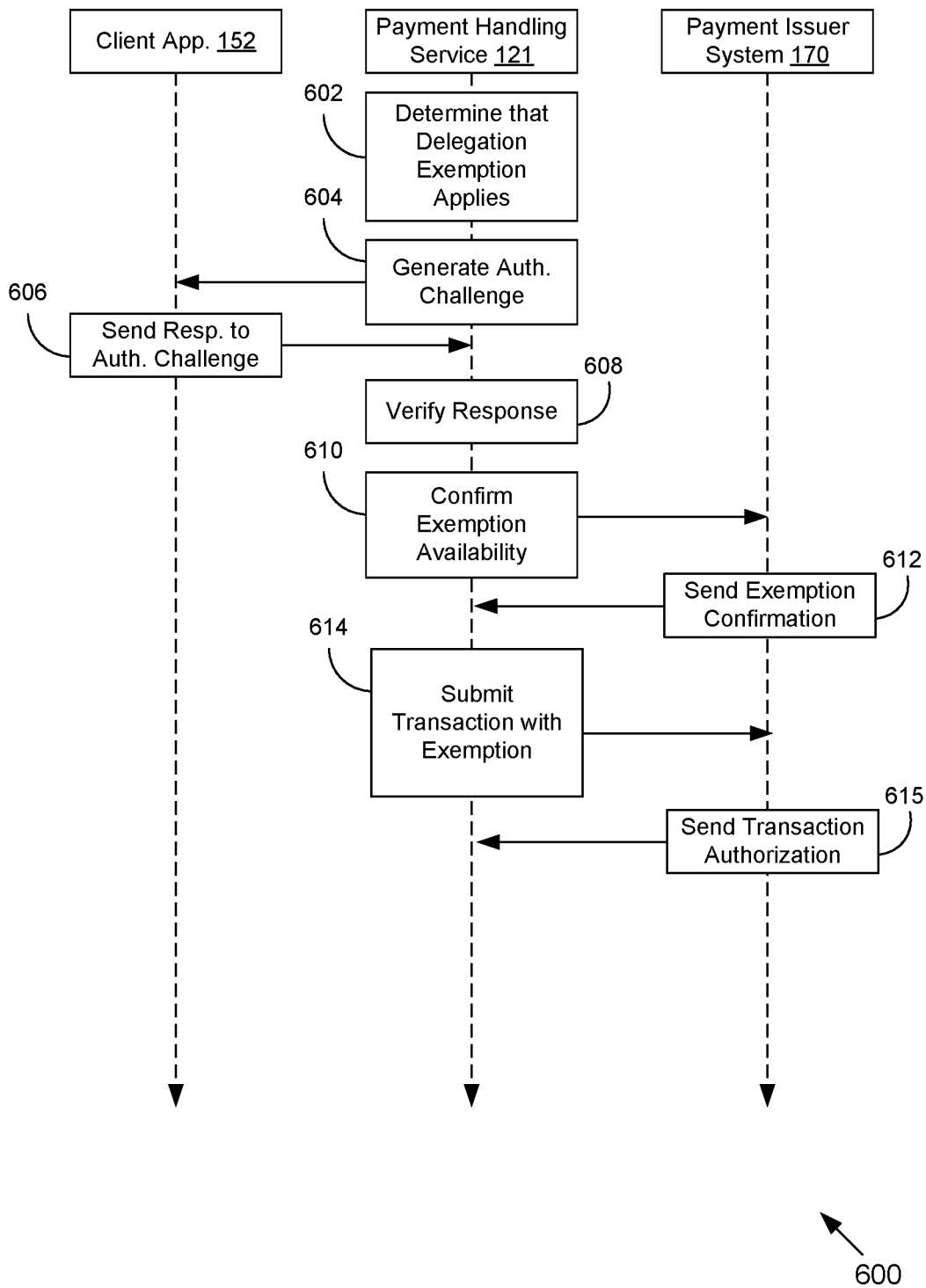

Moving on to FIG. 6, shown is a sequence diagram 600 that provides another example of the interaction among the client application 152 (FIG. 1), the payment handling service 121 (FIG. 1), and the payment issuer system 170 (FIG. 1) relating to delegated authentication. It is understood that the sequence diagram 600 of FIG. 6 provides merely an example of the many different types of functional arrangements that can be employed to implement the operation of the depicted portions of the client application 152, the payment handling service 121, and the payment issuer system 170. As an alternative, the sequence diagram of FIG. 6 can be viewed as depicting an example of elements of a method implemented within the networked environment 100 (FIG. 1).

Beginning with box 602, the payment handling service 121 determines that for a given payment transaction 227 (FIG. 2), the delegation exemption should apply. In this regard, the payment handling service 121 may determine that there exists a strong link between the payment instrument 233 (FIG. 2) used in the payment transaction 227 and the user account with the payee entity. Also, the payment handling service 121 may determine that the payment issuer supports the delegation exemption and that this payment transaction 227 qualifies under the delegation agreement criteria 223 (FIG. 2).

Next, in box 604, the payment handling service 121 causes the authentication service 115 (FIG. 1) to generate an authentication challenge for the user. For example, the authentication service 115 may send a one-time password to a communication channel associated with the user account (e.g., email address, phone number, etc.). Alternatively, if supported by the client computing device 106 (FIG. 1), the authentication service 115 may initiate a biometric challenge (e.g., request a fingerprint scan, a face scan, a voice sample, etc.). To this end, the payment handling service 121 may ascertain the hardware capabilities of the client computing device 106 and tailor the authentication challenge to utilize the specific hardware capabilities of the client computing device 106. This can make the authentication challenge more convenient for the users while improving security.

In box 606, the client application 152 sends a response to the authentication challenge to the authentication service 115 associated with the payment handling service 121. The authentication service 115 verifies the response in box 608.

In box 610, the payment handling service 121 may send a request to confirm the availability of the delegation exemption to the payment issuer system 170. To this end, the payment handling service 121 may send an "AReq" request that specifies the delegation exemption to the payment issuer system 170 via 3DS 2.0 and receive approval before submitting the payment transaction 227 for processing by the acquirer associated with the payment issuer system 170. In box 612, the payment issuer system 170 sends a confirmation that the exemption is available to the payment handling service 121.

In box 614, the payment handling service 121 submits a payment transaction processing request 125 (FIG. 1) to the payment issuer system 170 with the delegation exemption requested. The payment handling service 121 may generate a unique authentication transaction identifier which together with the transaction amount will be cryptographically signed by using a keyed-hashed message authentication code (HMAC) and hashing algorithm supported by the payment issuer. The encryption key may be specific to the particular payment issuer system 170.

In box 615, the payment issuer system 170 validates the payment transaction 227 and returns an authorization for the payment transaction 227 to the payment handling service 121. Thereafter, the sequence diagram 600 ends.

Figure 7:
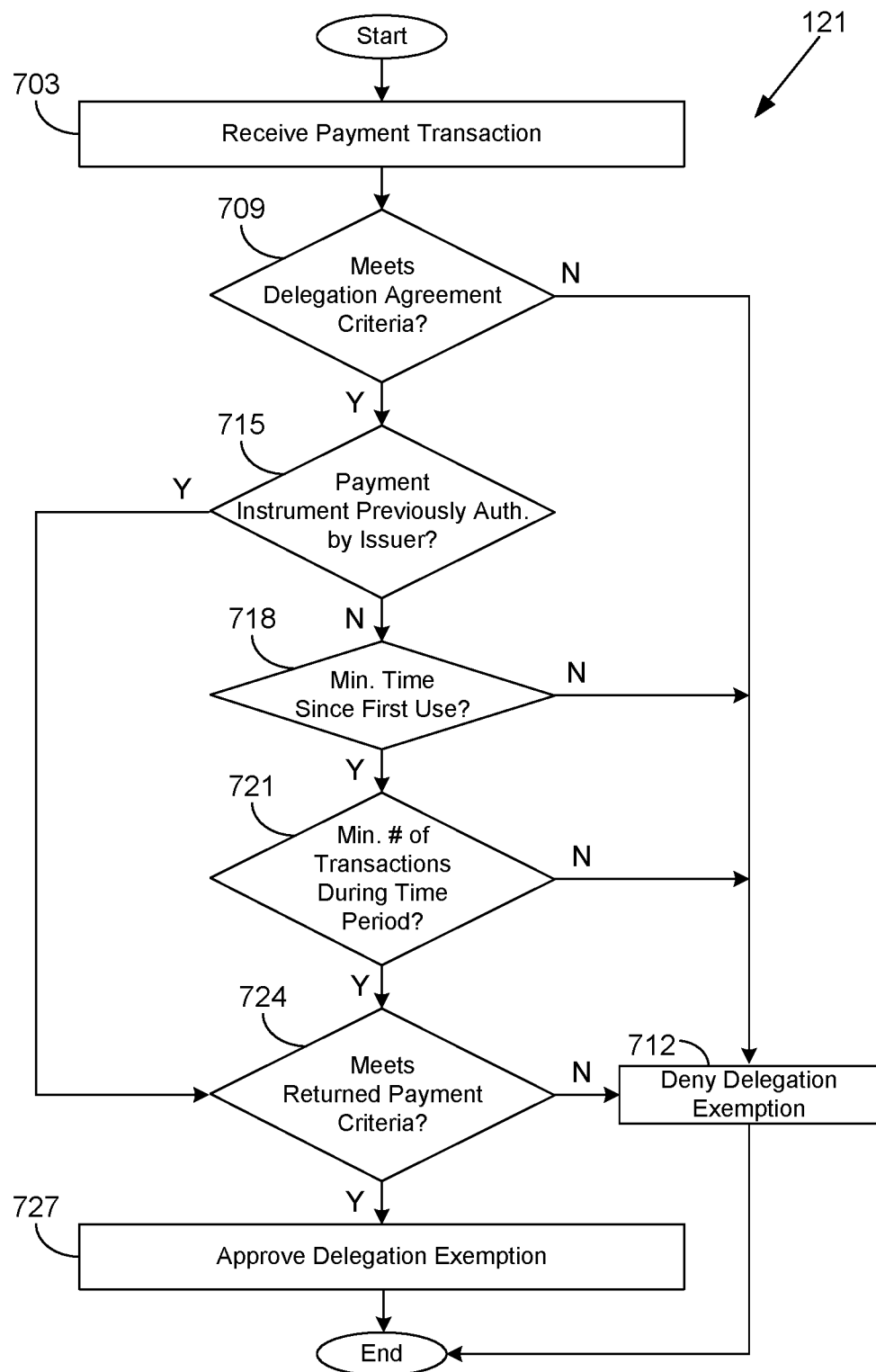
FIG. 7 is a flowchart illustrating examples of functionality implemented as portions of a payment handling system executed in a computing environment in the networked environment of FIG. 1 according to various embodiments of the present disclosure.

Turning now to FIG. 7, shown is a flowchart that provides one example of the operation of a portion of the payment handling service 121 relating to determining availability of a delegation exemption according to various embodiments. In particular, the flowchart illustrates a determination of whether a strong link exists between a payment instrument 233 (FIG. 2) and a user account such that the payee entity is willing to bear the liability. It is understood that the flowchart of FIG. 7 provides merely an example of the many different types of functional arrangements that may be employed to implement the operation of the portion of the payment handling service 121 as described herein. As an alternative, the flowchart of FIG. 7 may be viewed as depicting an example of elements of a method implemented in the computing environment 103 (FIG. 1) according to one or more embodiments.

Beginning with box 703, the payment handling service 121 receives a payment transaction 227 (FIG. 2). In box 709, the payment handling service 121 determines whether the payment transaction 227 meets delegation agreement criteria 223 (FIG. 2), which may be issuer-specific. To this end, the payment handling service 121 may identify the payment issuer based on a number of the payment instrument 233 used in the payment transaction 227 being within a payment instrument range 215 (FIG. 2) associated with the payment issuer. Once the payment issuer is identified, the delegation agreement criteria 223 which may be issuer-specific may be determined. In some cases, the payment issuer may not support the delegation exemption. The payee entity may also apply various restrictions, such as that the value may not exceed a certain value threshold, so as not to transfer liability.

If the payment transaction 227 does not meet the delegation agreement criteria 223, the payment handling service 121 moves to box 712 and denies the delegation exemption for the payment transaction 227. The payment transaction 227 may be eligible for other exemptions or an authentication challenge by payment issuer may be necessary. Thereafter, the operation of the portion of the payment handling service 121 ends.

If the payment transaction 227 does meet the delegation agreement criteria 223, the payment handling service 121 instead moves from box 709 to box 715. In box 715, the payment handling service 121 determines whether the payment instrument 233 is associated with a previous successful authentication challenge by the payment issuer system 170 (FIG. 1) for a payment transaction 227 involving the payee entity. If the payment instrument 233 is associated with a previous SCA challenge in this regard, the payment handling service 121 continues from box 715 to box 718.

In box 718, the payment handling service 121 determines from the usage history 238 (FIG. 2) whether a minimum time period has elapsed since a first use of the payment instrument 233 with the payment handling service 121. For example, the payee entity may require that 60 days, 90 days, or some other time period elapse since the first use of the payment instrument 233. If the minimum time period has elapsed, the payment handling service 121 transitions to box 721.

In box 721, the payment handling service 121 determines from the usage history 238 whether a minimum or predefined number of payment transactions 227 have been made using the payment instrument 233 within a time period, which may be the same time period as in box 718, or a different time period. If the minimum number of payment transactions have been made, the payment handling service 121 continues to box 724.

In box 724, the payment handling service 121 determines whether the payment instrument 233 meets returned payment criteria. For example, the payment handling service 121 may examine the returned payment history 237 (FIG. 2) to determine that no returned payment has occurred within a time period, which may be the same time period as in box 718 or box 721, or a different time period. If no returned payment has occurred in this time period, the payment handling service 121 continues to box 727 and the payment handling service 121 approves the application of the delegation exemption. Subsequently, the authentication service 115 (FIG. 1) may generate an alternative authentication challenge for the user that does not involve the payment issuer instead of an authentication challenge by the payment issuer. Thereafter, the operation of the portion of the payment handling service 121 ends.

If the payment handling service 121 instead determines in box 715 that the payment instrument 233 was the subject of a successful SCA challenge by the payment issuer, the payment handling service 121 moves from box 715 to box 724. In box 724, the payment handling service 121 determines whether the payment instrument 233 meets the returned payment criteria, which in this case would be no returned payment since the last successful SCA challenge. In this way, the payment handling service 121 determines that a payment transaction 227 using a payment instrument 233 issued by a payment issuer is eligible for a delegation exemption from an authentication challenge by the payment issuer based at least in part on a previous authentication challenge by the payment issuer being successfully completed for a previous payment transaction 227 using the payment instrument 233 and a returned payment history 237 associated with the payment instrument 233.

If no returned payment has occurred during this time period, the payment handling service 121 continues to box 727 and the payment handling service 121 approves the application of the delegation exemption. Subsequently, the authentication service 115 may generate an alternative authentication challenge for the user that does not involve the payment issuer instead of an authentication challenge by the payment issuer. Thereafter, the operation of the portion of the payment handling service 121 ends.

If the minimum time has not elapsed since the time of first use in box 718, if the minimum number of payment transactions 227 have not been made in the time period in box 721, or if the payment instrument 233 does not meet the returned payment criteria in box 724, the payment handling service 121 moves to box 712 and denies the delegation exemption for the payment transaction 227. The payment transaction 227 may be eligible for other exemptions or an authentication challenge by the payment issuer may be necessary. Thereafter, the operation of the portion of the payment handling service 121 ends.

Figure 8:
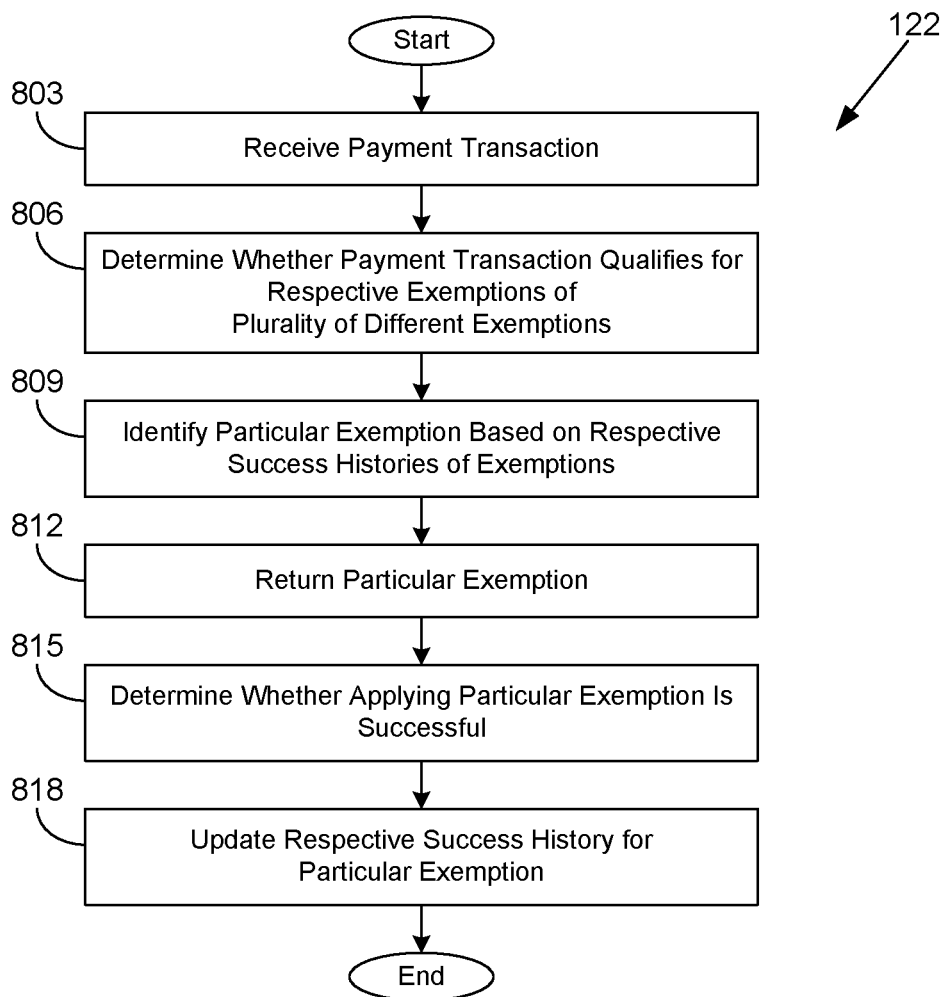
FIG. 8 is a flowchart illustrating examples of functionality implemented as portions of an exemption selection application executed in a computing environment in the networked environment of FIG. 1 according to various embodiments of the present disclosure.

Continuing to FIG. 8, shown is a flowchart that provides one example of the operation of a portion of the exemption selection engine 122 according to various embodiments. It is understood that the flowchart of FIG. 8 provides merely an example of the many different types of functional arrangements that may be employed to implement the operation of the portion of the exemption selection engine 122 as described herein. As an alternative, the flowchart of FIG. 8 may be viewed as depicting an example of elements of a method implemented in the computing environment 103 (FIG. 1) according to one or more embodiments.

Beginning with box 803, the exemption selection engine 122 receives a payment transaction 227 (FIG. 2) for which an exemption to an SCA challenge by the payment issuer is to be determined. In box 803, the exemption selection engine 122 determines whether the payment transaction 227 qualifies for each respective exemption from a plurality of different possible exemptions.

To this end, the exemption selection engine 122 may query each of a plurality of exemption plugins 123 (FIG. 1) to determine whether the respective exemption is available or potentially available. In querying specific exemption plugins 123, the exemption selection engine 122 may provide data regarding the payment transaction 227 to the exemption plugin 123. The exemption plugin 123 may then apply an exemption success machine learning model 218 (FIG. 2) and/or various thresholds 224 (FIG. 2) or other criteria specified in the exemption data 206 (FIG. 2) to determine whether the payment transaction 227 is eligible for the particular exemption. In some cases, the exemption plugins 123 may receive specific availability signals indicating availability of the exemption from the payment issuer system 170. For example, a payment issuer system 170 when queried by an exemption plugin 123 may indicate that the particular exemption is available or unavailable.

Examples of various exemptions are given as follows. A recurring payment transaction 227 that was set up prior to the enforcement of an SCA requirement may be eligible for a grandfathered recurring transaction exemption. A payee entity may accept the liability for the payment transaction 227 and perform its own risk analysis for the TRA exemption. The TRA exemption may define various value thresholds 224 associated with maximum fraud rates 212 (FIG. 2) for which the TRA exemption may be available. The payee entity may be eligible to perform an SCA challenge itself instead of the payment issuer, which is the delegation exemption. A user can designate the payee entity as a trusted beneficiary that no longer requires SCA, which is the trusted beneficiary exemption.

Payment transactions 227 having a value below a minimum threshold may be eligible for a low value exemption, but SCA by the payment issuer may be required every N payment transactions 227, which may include payment transactions 227 with other payee entities and unknown to the payee entity. Fixed amount recurring payment transactions 227 can be eligible for an exemption after the initial payment transaction 227. Payee entity-initiated payment transactions 227, which may include metered billing, may be eligible for an exemption. Also, payment transactions 227 may be made in countries or political subdivisions where the SCA requirements do not apply, and thus may be exempt.

The respective exemption plugins 123 determine, using the specific rules pertinent to each exemption, whether the exemption is available for a given payment transaction 227. Also, in some embodiments, the exemption plugins 123 may return data that can be used to request the exemption from the payment issuer system 170 (FIG. 1). For example, the data may be used within an "AReq" request sent by 3DS 2.0 to the payment issuer system 170.

In box 809, the exemption selection engine 122 identifies a particular exemption from potentially multiple available exemptions based at least in part on the respective exemption success histories 222 (FIG. 2). For example, a priority order may be automatically or manually established in the exemption selection rules 221 (FIG. 2), which may be generated in some cases by application of the exemption success machine learning models 218. The exemption may be selected in order to maximize the likelihood of success of the exemption, where the successful application of the exemption avoids SCA by the payment issuer. In some cases, no exemption is available, and the exemption selection engine 122 will return that SCA by the payment issuer is required. It is noted that the rules and criteria for identifying a particular one of potentially several exemptions may be determined in advance of receiving the payment transaction 227 in order to reduce latency.

In box 812, the exemption selection engine 122 returns an identification of the particular exemption, which can then be submitted in a payment transaction processing request 125 (FIG. 1) to a payment issuer system 170. In box 815, the exemption selection engine 122 determines whether applying the particular exemption is successful for this payment transaction 227. In box 818, the exemption selection engine 122 updates the respective exemption success history 222 for the exemption to indicate whether the exemption is successful and/or characteristics of the associated payment transaction 227. The updated exemption success history 222 may then be used in training the exemption success machine learning model 218 and/or generating the exemption selection rules 221. Thereafter, the operation of the portion of the exemption selection engine 122 ends.

Figure 9:
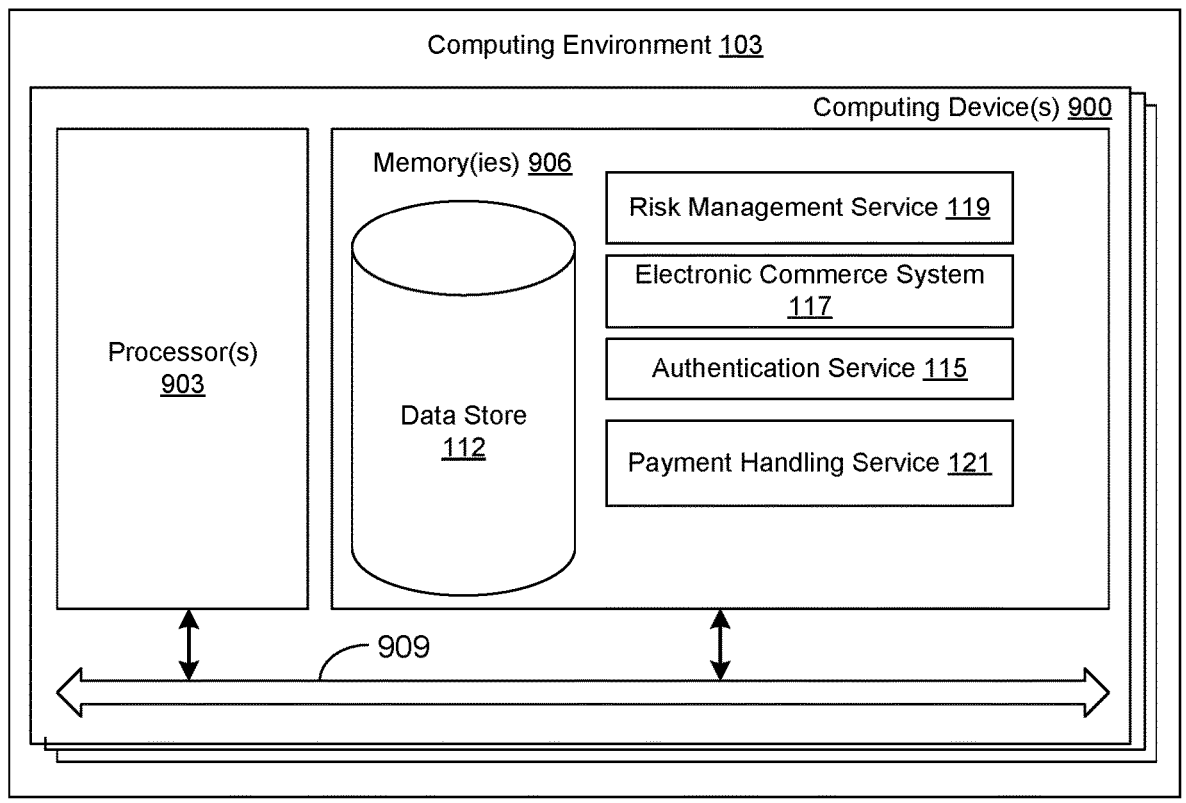
FIG. 9 is a schematic block diagram that provides one example illustration of a computing environment employed in the networked environment of FIG. 1 according to various embodiments of the present disclosure.

With reference to FIG. 9, shown is a schematic block diagram of the computing environment 103 according to an embodiment of the present disclosure. The computing environment 103 includes one or more computing devices 900. Each computing device 900 includes at least one processor circuit, for example, having a processor 903 and a memory 906, both of which are coupled to a local interface 909. To this end, each computing device 900 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the risk management service 119, the electronic commerce system 117, the authentication service 115, the payment handling service 121, and potentially other applications. Also stored in the memory 906 may be a data store 112 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the risk management service 119, the electronic commerce system 117, the authentication service 115, the payment handling service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4A-4B show the functionality and operation of an implementation of portions of the payment handling service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 4A-4B show a specific order of execution, it is understood that the order of execution may differ from that which is depicted. For example, the order of execution of two or more blocks may be scrambled relative to the order shown. Also, two or more blocks shown in succession in FIGS. 4A-4B may be executed concurrently or with partial concurrence. Further, in some embodiments, one or more of the blocks shown in FIGS. 4A-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the risk management service 119, the electronic commerce system 117, the authentication service 115, and the payment handling service 121, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the risk management service 119, the electronic commerce system 117, the authentication service 115, and the payment handling service 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 900, or in multiple computing devices 900 in the same computing environment 103.

Embodiments of the disclosure can be described in view of the following clauses:

Clause 1. A non-transitory computer-readable medium embodying a program executable in at least one computing device, wherein when executed the program causes the at least one computing device to at least: determine that a payment transaction for a payee entity involving a particular payment instrument issued by a particular payment issuer requires an authentication challenge by the particular payment issuer; generate a first user interface that includes a second user interface generated by the particular payment issuer, the second user interface including the authentication challenge and a component that, when selected, causes the authentication challenge to be avoided for a future payment transaction for the payee entity by designating the payee entity as a trusted beneficiary, the first user interface including a recommendation to select the component; determine that the payee entity has been designated as a trusted beneficiary for the particular payment instrument; and generate a third user interface that facilitates a user selection of one of a plurality of payment instruments associated with a user account, the plurality of payment instruments including the particular payment instrument, the third user interface differentiating the particular payment instrument based at least in part the payee entity being designated as the trusted beneficiary for the particular payment instrument.

Clause 2. The non-transitory computer-readable medium of clause 1, wherein when executed the program further causes the at least one computing device to at least: determine that a user of the user account meets a predefined criterion; and wherein the first user interface includes the recommendation to select the component and the second user interface includes the component in response to determining that the user meets the predefined criterion.

Clause 3. The non-transitory computer-readable medium of clauses 1 to 2, wherein the third user interface differentiates the particular payment instrument by including a badge icon adjacent to a representation of the particular payment instrument.

Clause 4. A method, comprising: determining, via at least one of one or more computing devices, that a payee entity has been designated as a trusted beneficiary for a particular payment instrument issued by a particular payment issuer; and generating, via at least one of the one or more computing devices, a user interface that facilitates a user selection of one of a plurality of payment instruments associated with a user account, the plurality of payment instruments including the particular payment instrument, the user interface differentiating the particular payment instrument based at least in part on the payee entity being designated as the trusted beneficiary for the particular payment instrument.

Clause 5. The method of clause 4, further comprising generating, via at least one of the one or more computing devices, a payee entity user interface for rendering in association with a payment issuer user interface, the payment issuer user interface including an authentication challenge and a component that, when selected, designates the payee entity as the trusted beneficiary, the payee entity user interface including a recommendation to select the component.

Clause 6. The method of clause 5, wherein the payee entity is restricted from modifying the payment issuer user interface.

Clause 7. The method of clauses 4 to 6, further comprising: receiving, via at least one of the one or more computing devices, the user selection of the particular payment instrument that has been designated as the trusted beneficiary; and after the user selection of the particular payment instrument that has been designated as the trusted beneficiary, refraining from redirecting a client device to receive an authentication challenge performed by the particular payment issuer that would be required had another one of the plurality of payment instruments that is not designated as the trusted beneficiary been selected.

Clause 8. The method of clause 7, wherein the authentication challenge corresponds to at least one of: a one-time password sent by the particular payment issuer to a communication channel associated with the particular payment instrument, or a biometric challenge initiated by the particular payment issuer.

Clause 9. The method of clauses 4 to 8, wherein determining that the payee entity has been designated as the trusted beneficiary for the particular payment instrument issued by the particular payment issuer further comprises receiving data from the particular payment issuer in response to a successful payment transaction using the particular payment instrument, the data indicating that the payee entity has been designated as the trusted beneficiary.

Clause 10. The method of clauses 4 to 9, wherein determining that the payee entity has been designated as the trusted beneficiary for the particular payment instrument issued by the particular payment issuer further comprises receiving data from the particular payment issuer in response to a user designating the payee entity as the trusted beneficiary through a network site of the particular payment issuer.

Clause 11. The method of clauses 4 to 10, wherein the user interface differentiates the particular payment instrument based at least in part on indicating a preferred status for the particular payment instrument.

Clause 12. The method of clause 11, wherein the preferred status is indicated by at least one of: a badge icon or a textual description.

Clause 13. The method of clauses 4 to 12, wherein the user interface differentiates the particular payment instrument based at least in part on prioritizing the particular payment instrument ahead of another payment instrument in a listing of the plurality of payment instruments within the user interface.

Clause 14. The method of clauses 4 to 13, wherein the user interface differentiates the particular payment instrument based at least in part on showing the particular payment instrument and hiding another payment instrument in a listing of the plurality of payment instruments within the user interface.

Clause 15. The method of clauses 4 to 14, wherein the user interface differentiates the particular payment instrument based at least in part on automatically selecting the particular payment instrument as a default payment instrument.

Clause 16. A system, comprising: at least one computing device; and a payment handling service executable in the at least one computing device and operated for a payee entity, wherein when executed the payment handling service causes the at least one computing device to at least: determine that a payment transaction for the payee entity involving a particular payment instrument issued by a particular payment issuer requires an authentication challenge by the particular payment issuer; and generate a first user interface that includes a second user interface generated by the particular payment issuer, the second user interface including the authentication challenge and a component that, when selected, causes the authentication challenge to be avoided for a future payment transaction for the payee entity, the first user interface including a recommendation to select the component.

Clause 17. The system of clause 16, wherein when executed the payment handling service further causes the at least one computing device to at least: receive data from the particular payment issuer indicating that the authentication challenge will be avoided for the future payment transaction for the payee entity; and store an indication in a data store that the payee entity is a trusted beneficiary for the particular payment instrument.

Clause 18. The system of clause 17, wherein when executed the payment handling service further causes the at least one computing device to at least generate a third user interface that facilitates a user selection of one of a plurality of payment instruments associated with a user account, the plurality of payment instruments including the particular payment instrument, the third user interface differentiating the particular payment instrument based at least in part the payee entity being the trusted beneficiary for the particular payment instrument.

Clause 19. The system of clauses 16 to 18, wherein the second user interface is not modifiable by the payment handling service.

Clause 20. The system of clauses 16 to 19, wherein the payment handling service is operated for a plurality of payee entities, and individual ones of the plurality of payee entities are capable of being designated as respective trusted beneficiaries for the particular payment instrument.

Clause 21. A non-transitory computer-readable medium embodying a program executable in at least one computing device, wherein when executed the program causes the at least one computing device to at least: determine that a payment transaction using a payment instrument issued by a payment issuer is eligible for a delegation exemption from an authentication challenge by the payment issuer in response to: determining that the payment instrument does not have a returned payment during a first time period; and at least one of: determining that a user has previously successfully responded to the authentication challenge by the payment issuer; or determining that the payment instrument has been used for at least a predefined number of payment transactions within a second time period and that a time of first use for the payment instrument is before the second time period; generate an alternative authentication challenge that does not involve the payment issuer instead of the authentication challenge by the payment issuer; verify that the user has correctly answered the alternative authentication challenge; request an approval to use the delegation exemption from the payment issuer; and submit the payment transaction for processing by the payment issuer with the delegation exemption.

Clause 22. The non-transitory computer-readable medium of clause 21, wherein when executed the program further causes the at least one computing device to at least: determine an encryption key associated with the payment issuer; and submit authentication confirmation to the payment issuer that is encrypted using the encryption key.

Clause 23. The non-transitory computer-readable medium of clauses 21 to 22, wherein when executed the program further causes the at least one computing device to at least: determine at least one payment issuer-specific criterion for the delegation exemption; and verify that the payment transaction meets the at least one payment issuer-specific criterion.

Clause 24. A method, comprising: determining, by a payee entity via at least one of one or more computing devices, that a payment transaction using a payment instrument issued by a payment issuer is eligible for a delegation exemption from an authentication challenge by the payment issuer based at least in part on a previous authentication challenge by the payment issuer being successfully completed for a previous payment transaction using the payment instrument and a returned payment history associated with the payment instrument; and in response to determining that the payment transaction is eligible for the delegation exemption, generating, by the payee entity via at least one of the one or more computing devices, an alternative authentication challenge that does not involve the payment issuer instead of the authentication challenge by the payment issuer.

Clause 25. The method of clause 24, further comprising: determining, via at least one of the one or more computing devices, a hardware capability of a client computing device initiating the payment transaction; and generating, via at least one of the one or more computing devices, the alternative authentication challenge to utilize the hardware capability.

Clause 26. The method of clauses 24 to 25, further comprising: determining, via at least one of the one or more computing devices, an encryption key associated with the payment issuer; and submitting, via at least one of the one or more computing devices, an authentication confirmation to the payment issuer that is encrypted using the encryption key.

Clause 27. The method of clauses 24 to 26, wherein determining that the payment transaction is eligible for the delegation exemption further comprises requesting, via at least one of the one or more computing devices, an approval from the payment issuer to use the delegation exemption for the payment transaction.

Clause 28. The method of clauses 24 to 27, wherein determining that the payment transaction is eligible for the delegation exemption further comprises determining, via at least one of the one or more computing devices, from the returned payment history that no returned payment has occurred for the payment instrument since a date of the previous authentication challenge by the payment issuer.

Clause 29. The method of clauses 24 to 28, wherein determining that the payment transaction is eligible for the delegation exemption further comprises determining, via at least one of the one or more computing devices, that at least a threshold time has elapsed since a time of first use of the payment instrument through the payee entity.

Clause 30. The method of clauses 24 to 29, wherein determining that the payment transaction is eligible for the delegation exemption further comprises determining, via at least one of the one or more computing devices, that at least a threshold number of payment transactions using the payment instrument have been performed through the payee entity over a predefined time period.

Clause 31. The method of clauses 24 to 30, further comprising: determining, via at least one of the one or more computing devices, that the alternative authentication challenge has been successfully completed by a client device; and submitting, via at least one of the one or more computing devices, the payment transaction for processing by the payment issuer in response to determining that the alternative authentication challenge has been successfully completed.

Clause 32. The method of clauses 24 to 31, wherein a liability for a fraudulent transaction shifts from the payment issuer to the payee entity upon use of the delegation exemption.

Clause 33. The method of clauses 24 to 32, wherein the alternative authentication challenge comprises at least one of: a one-time password sent through a communication channel associated with a user account, or a biometric challenge.

Clause 34. A system, comprising: at least one computing device; and a payment handling service operated by a payee entity and executable in the at least one computing device, wherein when executed the payment handling service causes the at least one computing device to at least: determine that a payment transaction using a payment instrument issued by a payment issuer is eligible for a delegation exemption from an authentication challenge by the payment issuer based at least in part on a usage history associated with the payment instrument and a returned payment history associated with the payment instrument; generate an alternative authentication challenge that does not involve the payment issuer instead of the authentication challenge by the payment issuer; and submit the payment transaction for processing by the payment issuer with the delegation exemption.

Clause 35. The system of clause 34, wherein the payment transaction is determined to be eligible for the delegation exemption further based at least in part on a value of the payment transaction being less than a maximum value threshold for the delegation exemption.

Clause 36. The system of clauses 34 to 35, wherein the payment transaction is determined to be eligible for the delegation exemption further based at least in part on a previous authentication challenge being performed by the payment issuer and successfully completed within a predefined time period.

Clause 37. The system of clauses 34 to 36, wherein the usage history indicates that at least a threshold time has elapsed since a time of first use of the payment instrument with the payee entity.

Clause 38. The system of clauses 34 to 37, wherein the usage history indicates that at least a threshold number of payment transactions have been performed with the payee entity using the payment instrument during a predefined time period.

Clause 39. The system of clauses 34 to 38, wherein the returned payment history indicates that no returned payments have occurred for the payee entity using the payment instrument during a predefined time period.

Clause 40. The system of clauses 34 to 39, wherein when executed the payment handling service further causes the at least one computing device to at least request an approval from the payment issuer to use the delegation exemption for the payment transaction.

Clause 41. A non-transitory computer-readable medium embodying a program executable in at least one computing device, wherein when executed the program causes the at least one computing device to at least: determine a ranking of a plurality of different exemptions from an authentication challenge performed by a payment issuer based at least in part on a corresponding likelihood of success for respective ones of the plurality of different exemptions; receive a payment transaction for a user account using a payment instrument from the payment issuer; determine, for the plurality of different exemptions, whether the payment transaction qualifies for the respective ones of the plurality of different exemptions; identify a particular exemption for the payment transaction from a subset of the plurality of different exemptions for which the payment transaction qualifies that is most likely to avoid the authentication challenge performed by the payment issuer according to the ranking; submit the payment transaction for processing by the payment issuer with the particular exemption requested; determine that the particular exemption has been approved by the payment issuer; and refrain from redirecting a client device associated with the user account to the authentication challenge performed by the payment issuer.

Clause 42. The non-transitory computer-readable medium of clause 41, wherein the plurality of different exemptions include at least one of: a first exemption based at least in part on a user designating a payee entity associated with the payment transaction as a trusted beneficiary, a second exemption based at least in part on the payment transaction being a recurring payment transaction associated with the payment instrument, a third exemption based at least in part on the payment transaction being initiated by the payee entity, a fourth exemption based at least in part on a value of the payment transaction being below a value threshold, or a fifth exemption based at least in part on an authentication challenge being performed by the payee entity instead of the authentication challenge performed by the payment issuer.

Clause 43. The non-transitory computer-readable medium of clauses 41 to 42, wherein when executed the program further causes the at least one computing device to at least perform an authentication challenge for a payee entity instead of the authentication challenge performed by the payment issuer.

Clause 44. A system, comprising: at least one computing device; and an exemption selection engine executable in the at least one computing device, wherein when executed the exemption selection engine causes the at least one computing device to at least: receive a payment transaction for a user account using a payment instrument from a payment issuer; determine, for a plurality of different exemptions from an authentication challenge performed by the payment issuer, whether the payment transaction qualifies for respective ones of the plurality of different exemptions; and identify a particular exemption for the payment transaction from a subset of the plurality of different exemptions for which the payment transaction qualifies based at least in part on respective success histories for respective ones of the subset of the plurality of different exemptions.

Clause 45. The system of clause 44, wherein the particular exemption is identified based at least in part on a machine learning model trained according to the respective success histories.

Clause 46. The system of clauses 44 to 45, wherein the exemption selection engine further causes the at least one computing device to at least generate the respective success histories and assign a ranking to the plurality of different exemptions based at least in part on the respective success histories prior to receiving the payment transaction.

Clause 47. The system of clauses 44 to 46, further comprising a payment handling service executable in the at least one computing device, wherein when executed the payment handling service further causes the at least one computing device to at least submit the payment transaction for processing by the payment issuer without the authentication challenge performed by the payment issuer by applying the particular exemption.

Clause 48. The system of clause 47, wherein when executed the payment handling service further causes the at least one computing device to at least: determine whether applying the particular exemption for the payment transaction is successful; and update the respective success history for the particular exemption.

Clause 49. The system of clauses 44 to 48, further comprising a plurality of exemption plugins executable in the at least one computing device, wherein individual ones of the plurality of exemption plugins are configured to report whether a corresponding exemption is available for the payment transaction.

Clause 50. The system of clause 49, wherein the individual ones of the plurality of exemption plug ins are further configured to generate respective data for requesting the corresponding exemption from the payment issuer.

Clause 51. The system of clauses 44 to 50, wherein one of the plurality of different exemptions corresponds to an exemption based at least in part on a user designating a payee entity associated with the payment transaction as a trusted beneficiary.

Clause 52. The system of clauses 44 to 51, wherein one of the plurality of different exemptions corresponds to an exemption based at least in part on the payment transaction being a recurring payment transaction associated with the payment instrument.

Clause 53. The system of clauses 44 to 52, wherein one of the plurality of different exemptions corresponds to an exemption based at least in part on the payment transaction being initiated by a payee entity.

Clause 54. The system of clauses 44 to 53, wherein one of the plurality of different exemptions corresponds to an exemption based at least in part on a value of the payment transaction being below a value threshold.

Clause 55. The system of clauses 44 to 54, wherein one of the plurality of different exemptions corresponds to an exemption based at least in part on an authentication challenge being performed by a payee entity instead of the authentication challenge performed by the payment issuer.

Clause 56. The system of clauses 44 to 55, wherein the payment transaction is received by the exemption selection engine from a third-party payee entity, and the exemption selection engine reports the particular exemption to the third-party payee entity.

Clause 57. A method, comprising: receiving, via at least one of one or more computing devices, a payment transaction for a user account using a payment instrument from a payment issuer; determining, via at least one of the one or more computing devices, for a plurality of different exemptions from an authentication challenge performed by the payment issuer, whether the payment transaction qualifies for respective ones of the plurality of different exemptions; identifying, via at least one of the one or more computing devices, a particular exemption for the payment transaction from a subset of the plurality of different exemptions for which the payment transaction qualifies that is most likely to avoid the authentication challenge performed by the payment issuer; and submitting, via at least one of the one or more computing devices, the payment transaction for processing by the payment issuer with the particular exemption requested.

Clause 58. The method of clause 57, further comprising: determining, via at least one of the one or more computing devices, that the payment issuer has denied the particular exemption; and redirecting, via at least one of the one or more computing devices, a client device associated with the user account to the authentication challenge by the payment issuer.

Clause 59. The method of clauses 57 to 58, further comprising: determining, via at least one of the one or more computing devices, that the payment issuer has approved the particular exemption; and refraining from redirecting, via at least one of the one or more computing devices, a client device associated with the user account to the authentication challenge by the payment issuer.

Clause 60. The method of clauses 57 to 59, further comprising generating, via at least one of the one or more computing devices, a ranking of the plurality of different exemptions for likelihood of success based at least in part on respective success histories of the plurality of different exemptions with the payment issuer.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   performing, by a payee entity via at least one of one or more computing devices, an initial authentication challenge for a user;
   receiving, by the payee entity via at least one of the one or more computing devices, a payment transaction request from a client computing device of the user, wherein the payment transaction request identifies a payment instrument associated with the user;
   determining, by the payee entity via at least one of one or more computing devices, that a payment transaction using the payment instrument issued by a payment issuer is eligible for a delegation exemption from an additional authentication challenge by the payment issuer based at least in part on both a previous authentication challenge by the payment issuer being successfully completed for a previous payment transaction using the payment instrument and a returned payment history associated with the payment instrument;
   in response to determining that the payment transaction is eligible for the delegation exemption, sending, by the payee entity via at least one of the one or more computing devices, a payment transaction processing request with a delegation exemption request for the payment issuer;
   receiving, by the payee entity via at least one of the one or more computing devices, a reply to the delegation exemption request from the payment issuer;
   generating, by the payee entity via at least one of the one or more computing devices, a user interface for performing an additional authentication challenge for the payment transaction, wherein the user interface comprises additional authentication challenge content, wherein the additional authentication challenge content comprises an authentication challenge controlled by the payment issuer when the reply from the payment issuer denies the delegation exemption request, wherein the additional authentication challenge content comprises an alternative authentication challenge instead of the authentication challenge by the payment issuer when the reply from the payment issuer approves the delegation exemption request, wherein the alternative authentication challenge is controlled by the payee entity and does not involve the payment issuer; and
   sending, via at least one of the one or more computing devices, data for rendering the user interface at the client computing device.

2. The method of claim 1, further comprising:
   determining, via at least one of the one or more computing devices, a biometric hardware capability of the client computing device initiating the payment transaction; and
   generating, via at least one of the one or more computing devices, the alternative authentication challenge to utilize the biometric hardware capability.

3. The method of claim 1, further comprising:
   determining, via at least one of the one or more computing devices, an encryption key associated with the payment issuer; and
   submitting, via at least one of the one or more computing devices, an authentication confirmation to the payment issuer that is encrypted using the encryption key.

4. The method of claim 1, wherein determining that the payment transaction is eligible for the delegation exemption further comprises determining, via at least one of the one or more computing devices, from the returned payment history that no returned payment has occurred for the payment instrument since a date of the previous authentication challenge by the payment issuer.

5. The method of claim 1, wherein determining that the payment transaction is eligible for the delegation exemption further comprises determining, via at least one of the one or more computing devices, that at least a threshold time has elapsed since a time of first use of the payment instrument through the payee entity.

6. The method of claim 1, wherein determining that the payment transaction is eligible for the delegation exemption further comprises determining, via at least one of the one or more computing devices, that at least a threshold number of payment transactions using the payment instrument have been performed through the payee entity over a predefined time period.

7. The method of claim 1, further comprising:
determining, via at least one of the one or more computing devices, that the alternative authentication challenge has been successfully completed by the client computing device; and
submitting, via at least one of the one or more computing devices, the payment transaction for processing by the payment issuer in response to determining that the alternative authentication challenge has been successfully completed.

8. The method of claim 1, wherein a liability for a fraudulent transaction shifts from the payment issuer to the payee entity upon use of the delegation exemption.

9. The method of claim 1, wherein the alternative authentication challenge comprises at least one of: a one-time password sent through a communication channel associated with a user account, or a biometric challenge.

10. The method of claim 1, further comprising verifying, by the payee entity via at least one of the one or more computing devices, a successful response to the initial authentication challenge.

11. A system, comprising:
at least one computing device comprising a processor and a memory; and
a payment handling service operated by a payee entity and stored in the memory, wherein when executed by the processor, the payment handling service causes the at least one computing device to at least:
perform an initial authentication challenge for a user;
receive a payment transaction request from a client computing device of the user, wherein the payment transaction request identifies a payment instrument associated with the user;
determine that a payment transaction using the payment instrument issued by a payment issuer is eligible for a delegation exemption from an additional authentication challenge by the payment issuer based at least in part on both a previous authentication challenge by the payment issuer being successfully completed for a previous payment transaction using the payment instrument and a returned payment history associated with the payment instrument;
in response to determining that the payment transaction is eligible for the delegation exemption, send a payment transaction processing request with a delegation exemption request for the payment issuer;
receive a reply to the delegation exemption request from the payment issuer;
generate a user interface for performing an additional authentication challenge for the payment transaction, wherein the user interface comprises additional authentication challenge content, wherein the additional authentication challenge content comprises an authentication challenge controlled by the payment issuer when the reply from the payment issuer denies the delegation exemption request, wherein the additional authentication challenge content comprises an alternative authentication challenge instead of the authentication challenge by the payment issuer when the reply from the payment issuer approves the delegation exemption request, wherein the alternative authentication challenge is controlled by the payee entity and does not involve the payment issuer; and
send data for rendering the user interface at the client computing device.

12. The system of claim 11, wherein when executed the payment handling service further causes the at least one computing device to at least:
determine a biometric hardware capability of the client computing device initiating the payment transaction; and
generate the alternative authentication challenge to utilize the biometric hardware capability.

13. The system of claim 11, wherein when executed the payment handling service further causes the at least one computing device to at least:
determine an encryption key associated with the payment issuer; and
submit an authentication confirmation to the payment issuer that is encrypted using the encryption key.

14. The system of claim 11, wherein determining that the payment transaction is eligible for the delegation exemption further comprises determining from the returned payment history that no returned payment has occurred for the payment instrument since a date of the previous authentication challenge by the payment issuer.

15. The system of claim 11, wherein determining that the payment transaction is eligible for the delegation exemption further comprises determining that at least a threshold time has elapsed since a time of first use of the payment instrument through the payee entity.

16. The system of claim 11, wherein determining that the payment transaction is eligible for the delegation exemption further comprises determining that at least a threshold number of payment transactions using the payment instrument have been performed through the payee entity over a predefined time period.

17. The system of claim 11, wherein when executed the payment handling service further causes the at least one computing device to at least:
determine that the alternative authentication challenge has been successfully completed by the client computing device; and
submit the payment transaction for processing by the payment issuer in response to determining that the alternative authentication challenge has been successfully completed.

18. The system of claim 11, wherein a liability for a fraudulent transaction shifts from the payment issuer to the payee entity upon use of the delegation exemption.

19. The system of claim 11, wherein the alternative authentication challenge comprises at least one of: a one-time password sent through a communication channel associated with a user account, or a biometric challenge.

20. A non-transitory computer-readable medium embodying a program executable in at least one computing device, wherein when executed the program causes the at least one computing device to at least:
- perform an initial authentication challenge for a user;
- receive a payment transaction request from a client computing device of the user, wherein the payment transaction request identifies a payment instrument associated with the user;
- determine that a payment transaction using the payment instrument issued by a payment issuer is eligible for a delegation exemption from an additional authentication challenge by the payment issuer based at least in part on both a previous authentication challenge by the payment issuer being successfully completed for a previous payment transaction using the payment instrument and a returned payment history associated with the payment instrument;
- in response to determining that the payment transaction is eligible for the delegation exemption, send a payment transaction processing request with a delegation exemption request for the payment issuer;
- receive a reply to the delegation exemption request from the payment issuer;
- generate a user interface for performing an additional authentication challenge for the payment transaction, wherein the user interface comprises additional authentication challenge content, wherein the additional authentication challenge content comprises an authentication challenge controlled by the payment issuer when the reply from the payment issuer denies the delegation exemption request, wherein the additional authentication challenge content comprises an alternative authentication challenge instead of the authentication challenge by the payment issuer when the reply from the payment issuer approves the delegation exemption request, wherein the alternative authentication challenge is controlled by the payee entity and does not involve the payment issuer; and
- send data for rendering the user interface at the client computing device.

* * * * *